United States Patent [19]

Fisk et al.

[11] Patent Number: 4,947,316
[45] Date of Patent: Aug. 7, 1990

[54] INTERNAL BUS ARCHITECTURE EMPLOYING A SIMPLIFIED RAPIDLY EXECUTABLE INSTRUCTION SET

[75] Inventors: Dale E. Fisk; Lawrence W. Pereira, both of San Jose, Calif.; George Radin, Piermont, N.Y.

[73] Assignee: International Business Machines Corporation, Armonk, N.Y.

[21] Appl. No.: 566,925

[22] Filed: Dec. 29, 1983

[51] Int. Cl.[5] ............................................. G06F 13/38
[52] U.S. Cl. .................................................... 364/200
[58] Field of Search ... 364/200 MS File, 900 MS File

[56] References Cited

U.S. PATENT DOCUMENTS

| 3,753,234 | 8/1973 | Gilbert et al. | 364/200 |
| 4,270,167 | 5/1981 | Koehler et al. | 364/200 |
| 4,467,412 | 8/1984 | Hoff | 364/200 |
| 4,493,020 | 1/1985 | Kim et al. | 364/200 |
| 4,494,188 | 1/1985 | Nakane et al. | 364/200 |
| 4,530,051 | 7/1985 | Johnson et al. | 364/200 |
| 4,564,901 | 1/1986 | Tomlinson et al. | 364/200 |
| 4,594,660 | 6/1986 | Guenthner et al. | 364/200 |
| 4,638,453 | 1/1987 | Gran et al. | 364/900 |

OTHER PUBLICATIONS

Summers, R. C. and Wood, C., "Message Based Protocol for Interprocessor Communication", IBM TDB, Dec. 1979, pp. 2893-2895.

Primary Examiner—David L. Clark
Attorney, Agent, or Firm—Roy R. Schlemmer, Jr.

[57] ABSTRACT

An internal bus mechanism for implementation in a computing system characterized by having a limited number of primitive general function instructions provided for controlling all system operations. The architecture of the internal bus mechanism defines a bus instruction format which specifies the bus unit being requested, the operation being requested, and sufficient data to specify the operands necessary to perform the requested operations. Two basic classes of instructions are provided, one wherein the CPU waits until a requested operation is performed and the other wherein the CPU issues an instruction to a bus unit and proceeds to execute further instructions in parallel with the operation of the bus unit. If desired, various units of the memory hierarchy may be designated and operated as bus units. To further the philosophy of a primitive instruction set, the present architecture utilizes a small number of bus unit instructions to replace a large number of additional system instructions which would be necessary if the bus units were architected as part of the CPU itself. Hardware design and system protocols are disclosed and described for implementing these architectural objectives.

12 Claims, 16 Drawing Sheets

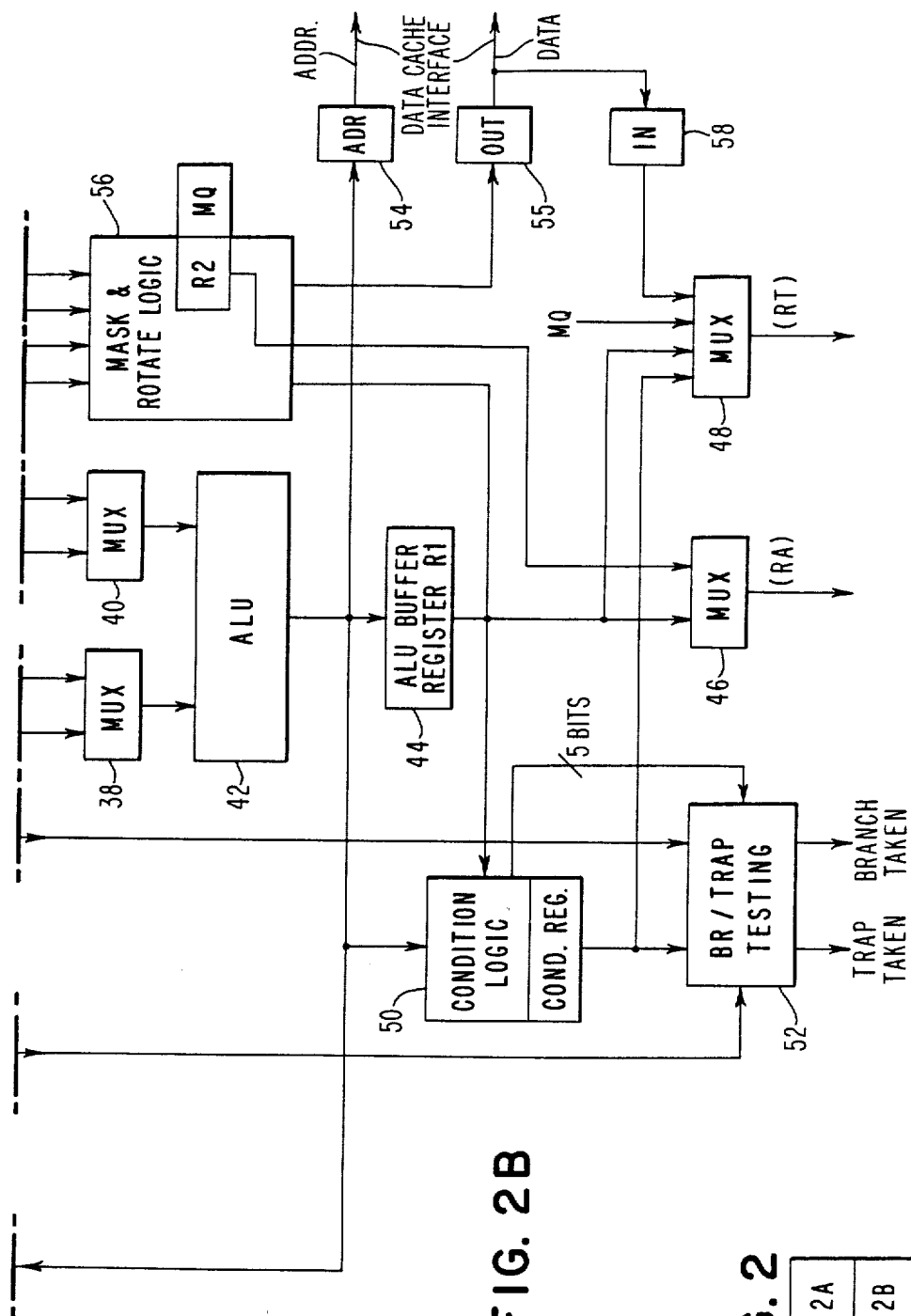

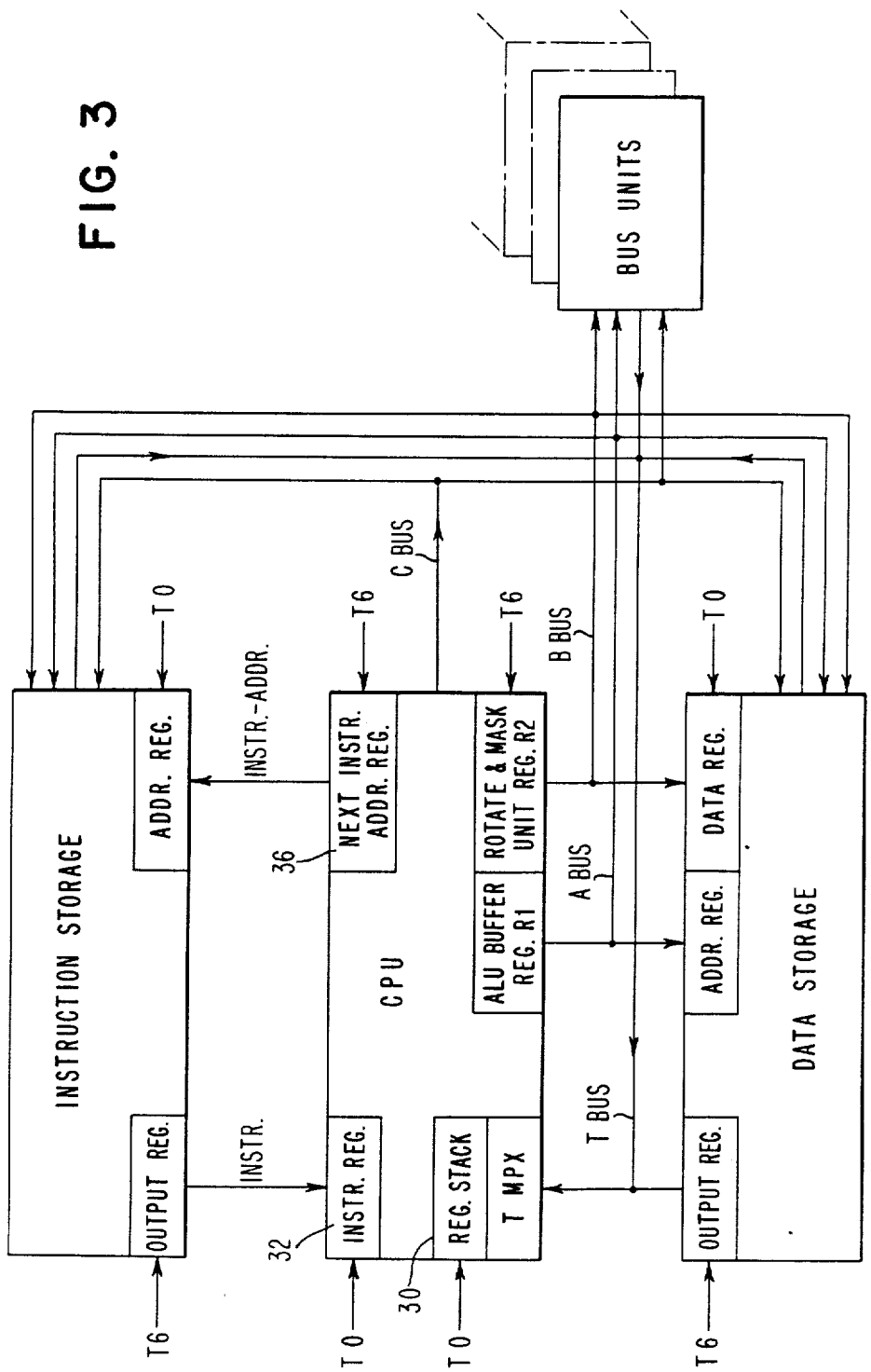

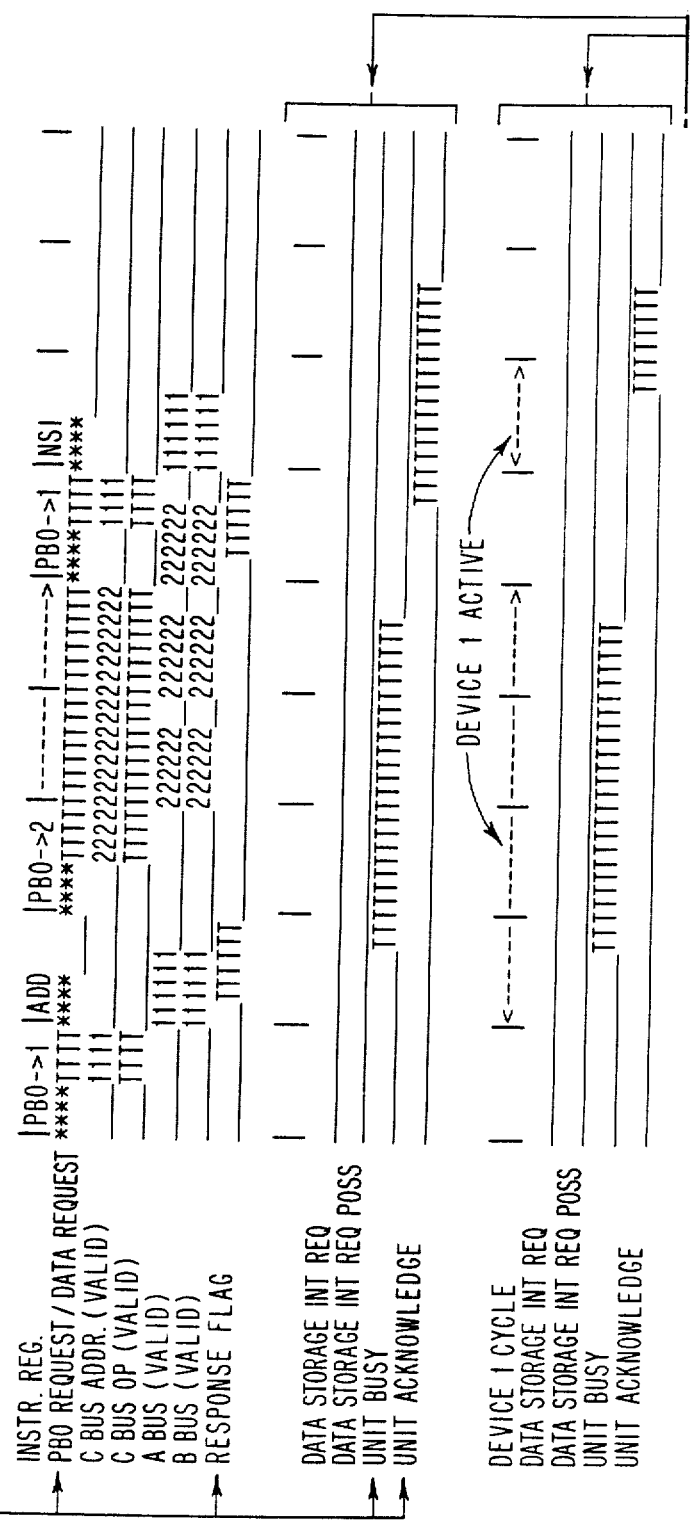

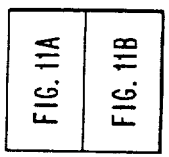
FIG. 11
FIG.11A
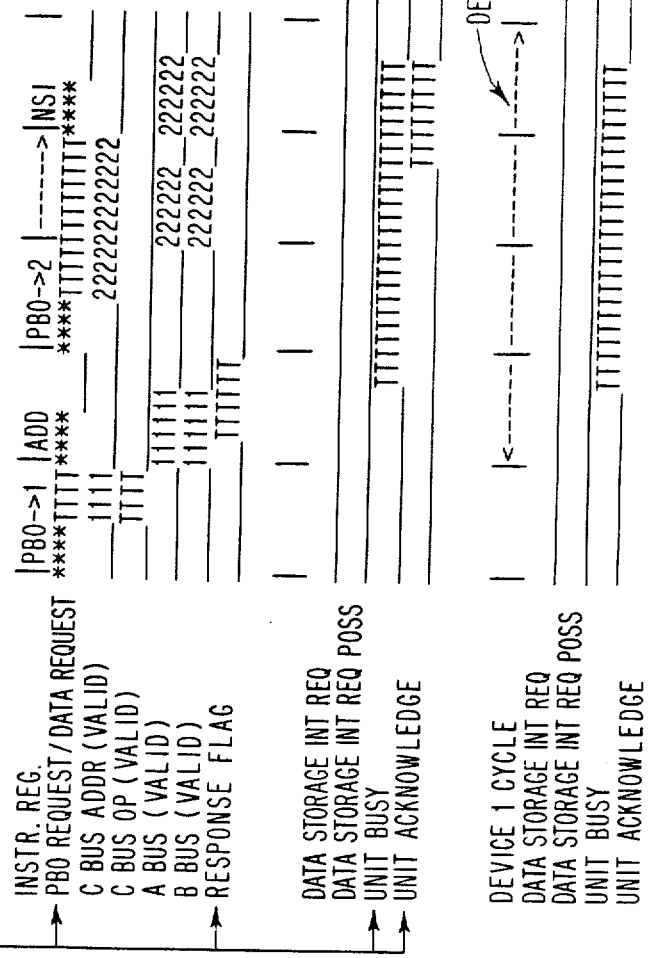

INTERNAL BUS ARCHITECTURE EMPLOYING A SIMPLIFIED RAPIDLY EXECUTABLE INSTRUCTION SET

BACKGROUND OF THE INVENTION

1. Field of the Invention

The present invention has particular utility in a reduced instruction set computer architecture, two examples of which are described in considerable detail, as to their basic architectural features as well as overall design consideration, in the two articles (1) "The 801 Minicomputer," by George Radin and (2) "RISC I: A reduced Instruction Set VLSI Computer," by Patterson and Sequin. The complete bibliographic data for these two articles is set forth more fully in the subsequent Prior Art section.

Current developments in the semiconductor industry indicate that very large-scale integration (VLSI) affords microprocessor designers two conflicting approaches to designing future systems. The first is that they can continue the current trend, where VLSI is used to build increasingly complex microprocessors, where greater complexity is exhibited as more hardware is added to do functions previously done by software alone. Alternatively, they can take the opposite approach and build simpler, very fast processors, where more functions are done by software. This second approach is exemplified in the two above-referenced articles.

Greater complexity lets designers use ever-cheaper VLSI circuits in place of increasingly expensive and processor time consuming software. What's more, the takeover of many software functions by hardware is said to help programmers develop high-level language (HLL) programs that are shorter, more efficient, and easier to write, compile and debug. More complex systems would, in theory, reduce the high cost of developing software and thus reduce the total life-cycle cost of a system.

Thus, system designers following the first approach increase the complexity of architectures commensurate with the increasing potential of implementation technologies, as exemplified by the complex successors of simpler machines. Compare, for example, VAX 11 to PDP-11, IBM System/38 to IBM System/3, and Intel APX-432 to 8086. The consequences of this complexity are increased design time, an increased potential for design errors and inconsistent implementations. This class of computers has been referred to in the literature as complex instruction set computing (CISC) systems.

As indicated previously in the above referenced article "The 801 Minicomputer" by G. Radin a coinventor of the present invention, a unique approach to overall CPU architecture has been realized following the second of the two previously mentioned approaches to architecture design, i.e., a reduced instruction set computer. The heart of such a system architecture is its CPU. Most of the aspects of this system are designed to make available to the user the fundamental power of the underlying CPU. The overall organization is somewhat different from more conventional CPUs.

There will now follow a brief overall description of the CPU design strategy utilized in the CPU of the Radin article followed by a more specific description of the details of the CPU insofar as is deemed necessary to provide a basis for understanding how the present invention fits into the overall system architectural scheme.

Conventional CPUs for general purpose systems in the middle range of cost are organized as hardwired microprocessors "interpreting" the architecture of the CPU. Thus the execution of a CPU instruction normally requires the execution of several "microinstructions" which normally reside in a high-speed memory called a "control store". The number of such microinstructions (or "machine cycles") required to execute an average CPU instruction depends on the power (hence cost) of the underlying microprocessor, the complexity of the CPU architecture, and the application being run (i.e., the instruction mix). Typically, for instance, an IBM S/370 model 168 will require 3-6 cycles per S/370 instruction, a model 148 will take 10-15 and a S/360 model 30 will need over 30 cycles.

Very sophisticated S/370 CPU designs have demonstrated the possibility of approaching one machine cycle per instruction by using techniques of look-ahead, parallel execution and keeping branch histories.

Instruction mixes for different application types show differences in frequency of execution of instructions. For instance, scientific applications will use the S/370 floating point instructions and commercial applications will use decimal arithmetic. But, especially when an entire running system is traced instead of just the application code, there is a remarkable similarity in the list of most popular instructions. Moreover, these tend to be rather simple functions, such as load, store, branch, compare, integer arithmetic, logic shifting. These same functions generally are found to be in the instruction repertoire of the underlying microprocessor. Thus, for these functions, it was considered wasteful to pay the interpretive overhead necessary when the micro-architecture does not precisely match the CPU architecture.

Therefore, the primitive instruction set designed for the subject primitive reduced instruction set machine system may be directly executed by hardware. (In the subsequent description, the acronym PRISM will be used instead of the full expression PRimitive Instruction Set Machine for convenience of reference.) That is, every primitive instruction takes exactly one machine cycle. Complex functions are implemented in "microcode" just as they are in conventional CPUs, except that in the present system this microcode is just code; that is, the functions are implemented by software subroutines running on the primitive instruction set.

The advantages of micro-code that accrue because it resides in high-speed control store virtually disappear with a memory hierarchy in which the cache is split into a part that contains data and a part that contains instructions. The instruction cache acts as a "pageable" control store because frequently-used functions will, with very high probability, be found in this high-speed memory. The major difference is that in a conventional CPU the architect decides in advance which functions will most frequently be used across all applications. Thus, for instance, double precision floating point divide always resides in high speed control store while the First Level Interrupt Handler may be in main memory. With an instruction cache it is recent usage that decides which functions will be available more quickly.

With this approach, the number of cycles required to do a particular job is at worst no more than on a conventional (low-to-moderately priced) CPU in which the complex instructions have been microprogrammed. But by carefully defining the primitive instructions to be an excellent target machine for the compiler, it has been found that far fewer cycles are actually required. In fact, for systems programs, fewer instructions are required than are required in IBM S/370 systems.

Most instruction mixes show that between 20% and 40% of instructions go to storage to send or receive data, and between 15% and 30% of instructions are branches. Moreover, for many applications, a significant percent of the memory bandwidth is taken for I/O. If the CPU is forced to wait many cycles for storage access its internal performance will be wasted.

A major goal of the present (PRISM) system design, therefore, was to organize the storage hierarchy and develop a system architecture to minimize CPU idle time due to storage access. First, it was clear that a cache was required whose access time was consistent with the machine cycle of the CPU. Secondly a "store-in-cache" strategy was used (instead of "storing through" to the backing store) so that the 10% to 20% of expected store instructions would not degrade the performance severely. (For instance, if the time to store a word is ten cycles, and 10% of instructions are stores, the CPU will be idle about half the time unless it can overlap execution of the instructions following the store.)

But a CPU organization which needs a new instruction at every cycle as well as accessing data every third cycle will be degraded by a conventional cache which delivers only one word per cycle. Thus the cache was split into a part containing data and a part containing instructions. In this way the bandwidth to the cache was effectively doubled and asynchronous fetching of instructions and data from the backing store was permitted.

Conventional architectures make this decision difficult because every store of data can be a modification of an instruction, perhaps even the one following the store. Thus the hardware must ensure that the two caches are properly synchronized, a job that is either expensive or degrading, or (generally) both. Even instruction pre-fetch mechanisms are complex since the effective address of a store must be compared to the Instruction Address Register.

It has been found, however, that when index registers were introduced into computers the frequency of instruction modification fell dramatically, until today, instructions are virtually never modified. Therefore, the PRISM architecture does not require this hardware broadcasting. Instead it exposes the existence of the split cache and provides instructions by which software can synchronize the caches when required, which is only in such functions as "program fetch."

Similarly, in conventional systems in which the existence of a cache is unobservable to the software, I/O must (logically) go through the cache. This is often accomplished in less expensive systems by sending the I/O physically through the cache.

The result is that the CPU must wait while the I/O proceeds, and that after an I/O burst the contents of the cache no longer reflect the working set of the process being executed, forcing it back into transient mode. Even in expensive systems a broadcasting or directory-duplication strategy may result in some performance degradation.

It was noted that responsibility for the initiation of I/O in current systems was evolving toward system access methods using fixed block transfers and a buffer strategy which normally moved data between subsystem buffers and user areas (e.g., IMS, VTAM, VSAM, paging). This implies that the access method knows the location and extent of the buffer and knows when an I/O transfer is in process. Thus this software can properly synchronize the caches, and the "channel" (Direct Memory Adapter in the PRISM system) can transmit directly to and from the backing store. The result of this system approach is that even when half of the memory bandwidth is being used for I/O the CPU is virtually undegraded.

Notice that in all of the preceding discussions an underlying strategy is being applied. Namely, wherever there is a system function which is expensive or slow in all its generality, but where software can recognize a frequently occurring degenerate case (or can move the entire function from run time to compile time) that function is moved from hardware to software, resulting in lower cost and improved performance.

One interesting example of the application of this overall design strategy concerns managing the cache itself. In the PRISM system the cache line is 32 bytes and the largest unit of a store is four bytes. In such a cache, whose line size is larger than the unit of a store and in which a "store in cache" approach is taken, a store directed at a word which is not in the cache must initiate a fetch of the entire line from the backing store into the cache. This is because, as far as the cache can tell, a load of another word from this line might be requested subsequently. Frequently, however, the store is simply the first store into what, to the program, is newly acquired space. It could be temporary storage on a process stack (e.g., PL/I Automatic) just pushed on procedure call; it could be an area obtained by a Getmain request; or it could be a register store area used by the First Level Interrupt Handler. In all of these cases the hardware does not know that no old values from that line will be needed, while to the software this situation is quite clear.

Accordingly, an instruction has been defined in the PRISM system called SET DATA CACHE LINE, which instructs the cache to establish the requested line in its directory but not to get its old values from the backing store. (Thus, after execution of this instruction, the values in this line will be whatever happened to be in the cache at the time.) If this instruction is executed whenever fresh storage is acquired unnecessary fetches from the backing store will be eliminated. (On the other hand, the execution of the instruction for each new line itself adds CPU cycles. Performance modelling on specific hardware configurations running specific applications will indicate the best tradeoff.)

Similarly when a scratch storage area is no longer needed, executing the instruction INVALIDATE DATA CACHE LINE will turn the "changed" bit off in the cache directory entry corresponding to the named line, thus eliminating an unnecessary storeback. (See copending PCT U.S. application Ser. No. 82/01830).

The above general discussion of the PRISM features which result in overlapped access to the cache between instructions and data, overlapped backing store access among the caches and I/O, less hardware synchronizing among the caches and I/O, and techniques to improve the cache hit ratios, indicates the overall flavor of the PRISM design objectives.

However, to fully realize the potential objectives of the PRISM system's overall design approach, it has been found advantageous to include certain hardware modifications whereby a number of powerful one-machine cycle executable instructions are available. Five of these architectural features are set forth and described in the present application and the four co-pending related U.S. patent application Ser. Nos.:

U.S. patent application Ser. No. 509,733 (Y0983-008)

U.S. patent application Ser. No. 509,744 (Y0983-009)

U.S. patent application Ser. No. 509,734 (Y0983-010)

U.S. patent application Ser. No. 509,836 (Y0983-011)

Historically, a computer has attached devices to the main CPU by means of specifically defined channels, such as the S/360 Selector Channel. This channel provides a versatile, flexible medium for trnasferring data between the CPU and a broad variety of peripheral devices. Typically, these devices provide specific system functions such as printing, on-line data storage, card readers, etc. In addition, within the CPU many specific data paths (usually called busses) exist to allow various internal functions to communicate. These functions—registers arithmetic units, control latches, etc.—are designed to support the CPU requirements of computation and control of data movement. A major difference between the two types of communication is the speed of data transfers and the general overhead required to achieve these transfers. A channel is, in general, much slower and requires much more overhead to accomplish a transfer of data than does an internal data bus.

The Internal Bus allows internal data paths of the CPU to become available to a range of functions in a manner similar to the way a Channel does. Prior art treats most internal data paths as being required to support specific functions of the CPU. Many CPU designs have multipurpose busses, where data for several functions is communicated over a common set of wires, but always under control of CPU hardware designed specifically to support those functions. In some cases, optional features (such as a floating point unit) can be attached to a CPU via existing busses, but again these optional features are under dedicated control of CPU hardware designed specifically to support these features. In addition, most computers have a range of supporting functions that are attached in some way to the CPU internal data paths. Usually this attachment is via specially designed circuitry specific to that function. Examples of supporting functions are floating point units, real time clocks, interrupt control functions, emulator units, and cache memory subsystems.

RELATED U.S. PATENT APPLICATIONS

The subject application is related to other applications having different inventorship entities filed on the same day and owned by the same assignee as the present application. These other applications:

(1) U.S. patent application Ser. No. 509,733 (Y0983-008), entitled "Mechanism for Implementing One Machine Cycle Executable Trap Instructions in a Primitive Instruction Set Computing System," by M. A. Auslander, J. Cocke, H. T. Hao, P. W. Markstein and G Radin.

(2) U.S. patent application Ser, No. 509,744 (Y0983-009), entitled "Condition Register Architecture for a Primitive Instruction Set Machine," by M. A. Auslander, J. Cocke, H. T. Hao, P. W. Markstein and G. Radin.

(3) U.S. patent application Ser. No. 509,734 (Y0983-010), entitled "Mechanism for Implementing One Machine Cycle Executable Branch-On-Bit-In-Any-Register Instructions in a Primitive Instruction Set Computing System," by M. A. Auslander, H. T. Hao, M. E. Hopkins, P. W. Markstein, G. Radin and W. S. Worley, Jr.

(4) U.S. patent application Ser. No. 509,836 (Y0983-011), entitled "Mechanism for Implementing One Machine Cycle Executable Mask and Rotate Instructions in a Primitive Instruction Set Computing System," by H. T. Hao, P. W. Markstein and G. Radin.

The two following PCT applications filed Dec. 30, 1982 are related to the present application in that they also have particular memory hierarchy including a split cache and to an address translation mechanism, respectively.

(1) PCT U.S. Ser. No. 82/01830, entitled "Hierarchical Memory System Including Separate Cache Memories for Storing Data and Instructions," by F. P. Carrubba, J. Cocke, N. H. Kreitzer and G. Radin.

(2) PCT U.S. Ser. No. 82/01829, entitled "Virtual Memory Address Translation Mechanism with Controlled Data Persistence," by A. Chang, J. Cocke, M. F. Mergen and G. Radin.

PRIOR ART

An article entitled "The 801 Minicomputer," by George Radin, published in ACM SIGPLAN NOTICES, Vol. 17, No. 4, April 1982, pages 39–47, includes a general description of an experimental computer whose operational characteristics depend to a large extent on a very fast memory subsystem having separate caches for instruction and data and also having a primitive very basic instruction set providing most commonly used machine operations most of which should be executable in a single machine cycle. The present one cycle executable trap instruction has particular utility in such a machine architecture.

A similar CPU architecture has been described by Patterson and Sequin in "RISC 1: a Reduced Instruction Set VLSI Computer," in the IEEE 8th Annual Symposium on Architecture Conference Proceedings of May 12-14, 1981, at pages 443–449, and in expanded form in IEEE Computer, September 1982 at pages 8-20. The RISC 1: system is stated to be a reduced instruction set machine. No reference is made to any special internal bus architecture on hardware for implementing same in this article.

U.K. Patent No. 2,035,634 (U.S. patent application Ser. No. 949,923) discloses a system bus architecture wherein bus units are functionally addressed by OP-COPE rather than by unit address as in the present invention. Also the bus architecture and protocols are quite different.

U.S. Pat. No. 4,053,777 describes an internal system bus under control of bus commands, however, the bus unit addressing protocols and the particular bus architecture are quite different from that disclosed herein.

An IBM Technical Disclosure Bulletin article by J. J. Igel, Vol. 17, No. 12, (May 1975), entitled "Variable Performance Processors," pp 3708-10, describes a triple internal bus structure which can be tailored to include several interal bus functions but which does not have the generally expandable structure or the specific architecture and protocols of the herein disclosed bus architecture.

The following U.S. Pat. Nos. were found during a prior art search and although generally relating to or disclosing internal system buses are derived to be less relevant than those described above and are accordingly not specifically commented on.

U.S. Pat. No. 4,205,373

U.S. Pat. No. 4,309,754

U.S. Pat. No. 4,296,464

U.S. Pat. No. 4,225,921

U.S. Pat. No. 4,053,947

SUMMARY AND OBJECTS

It is a primary object of the present invention to provide an improved internal bus architecture for use in a primitive instruction set machine organization.

It is a further object to provide such an internal bus architecture whereby a wide variety of functional units including memory subsystems may be directly attached to and be readily available over said bus.

It is another object to provide such internal bus mechanism wherein various system operations may be done in parallel with the operation of the CPU utilizing said internal bus architecture.

It is yet another object of the invention to provide such an internal bus architecture wherein bus units are specified, operations requested, and other necessary data provided in a single uniform bus instruction which is essentially coded by the CPU and placed on the internal bus in a single machine cycle whereby system throughput is maximized.

It is a further object to provide such an internal bus architecture wherein the actual bus configuration is designed to provide data paths to effectuate the high speed transmission of data, addresses and op codes to all units attached to said bus as well as the CPU.

The foregoing and other objects, features and advantages of the invention will be apparent from the following description of the preferred embodiment of the invention as set forth n the attached specification, drawings and claims.

The objects of the present invention are accomplished in general by an internal bus architecture for a high speed digital electronic computing system including an instruction decoding mechanism for decoding bus instructions to be placed on said internal bus whereby a particular bus is addressed, a specific operation is requested, and all data necessary to identify specific operands related to said specified instruction is, in turn, completely identified. Each bus unit includes means for recognizing that it is being requested to perform a specified operation. The CPU also includes means responsive to a particular bus operation to selectively cause the CPU to wait until the specified operation is completed or to continue executing further instructions in parallel with the requested bus operation.

The bus per se comprises a first unidirectional set of lines (B-bus) for transmitting data; a second set of unidirectional lines (T-bus) for transmitting data from a bus unit to the CPU; a third set of unidirectional lines (A-bus) for transmitting address data from the CPU to a bus unit and a fourth set of unidirectional lines (C-bus) for transmitting instruction and control data between the CPU and the bus units. Bus driver circuits are provided in the CPU and each bus unit for placing the data on the respective lines making up the bus.

BRIEF DESCRIPTION OF THE DRAWINGS

FIG. 2 comprises an organizational drawing for FIGS. 2A and 2B.

FIGS. 2A and 2B comprise a functional block diagram and data flow diagram of a PRISM CPU architecture designed to utilize the internal bus architecture of the present invention.

FIG. 3 comprises a functional block diagram of the present internal bus architecture showing more detail than FIG. 1.

FIG. 10 is an organizational drawing of FIGS. 10A and 10B.

FIGS. 10A and 10B comprise a composite timing diagram illustrating the timing and/or occurrence of certain Internal Bus Interface control signals occurring during a third possible PBO scenario on the herein disclosed Internal Bus mechanism.

FIG. 11 is an organizational drawing of FIGS. 11A and 11B.

FIGS. 11A and 11B comprise a composite timing diagram illustrating the timing and/or occurrence of certain Internal Bus Interface control signals occurring during a fourth possible PBO scenario on the herein disclosed Internal Bus mechanism.

DESCRIPTION OF THE PREFERRED EMBODIMENT

The Internal Bus architecture described herein advances the art of computing by teaching that a general interface can be configured that will allow attachment of arbitrary functions to CPU internal data paths, allowing extremely efficient data communications between the CPU and these functions. At the same time, these functions are isolated from the internal data paths in such a way that the internal CPU speed of operation is not affected. The Internal Bus supports many functions required by the CPU, as well as providing an efficient growth path for future functions. By providing a well-specified communication method, design errors are reduced and the CPU operation is easier to understand, simplifying CPU maintenance requirements. In addition, the standard method of communicating between internal CPU functions reduces the number of specific circuit designs required as well as reducing the total number of wires necessary to control these functions.

During the 1960's, computer design was greatly enhanced by the use of microcode to implement instruction execution. Microcode allowed the hardware design to be completed, at least somewhat divorced from the intricacies of each instruction function. Microcode allowed enhancements to be added to a CPU without requiring a major hardware design cycle.

Now, in the 1980's, Very Large Scale Integration has made similar dramatic changes to computer design. The cost of electronic functions has been reduced by orders of magnitude, allowing economical design of a computer with a range of functions unheard of even in the recent past. It is now possible for a single printed circuit card to provide functions that use to require several large boxes. This is now done more or less routinely, collapsing the inter-box cables of earlier systems into cord wiring.

It is the purpose of this patent to introduce to the art of computing a design flexibility similar to that provided by the use of microcode.

The prior art contains many examples of computer designs with multiple, extendable busses allowing additional functions to be attached directly to the internal data flow of a computer, under control of that computer. However, this does create another problem. Computer design emphasizes speed of operation. To achieve this, data paths are kept short and the number of internal connections are minimized. Simple extensions of data paths add to the internal CPU complexity, thereby reducing performance of the computer. This patent teaches that a carefully defined interface to the computer will allow flexible attachment while at the same time allowing the computer performance to be optimized. It is, in effect, a marriage of the Channel of the 1960's to VLSI of the 1980's. It allows a computer design to be optimized, at least somewhat divorced from the requirements of attached functions. It brings the performance improvements and packaging efficiencies of VLSI to the computer user.

Figure 1:
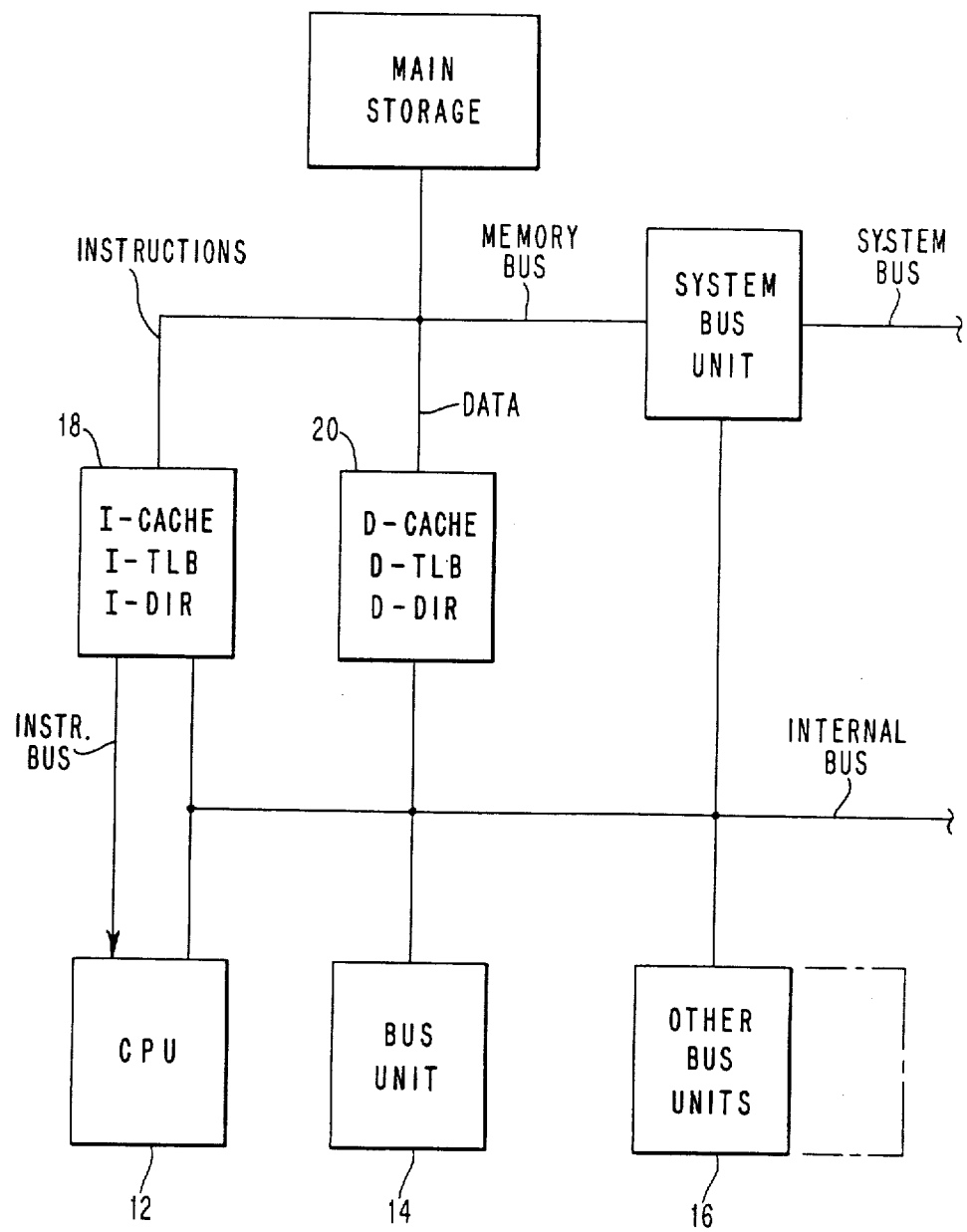
FIG. 1 comprises a high level block diagram of the primary system components including the CPU, main storage, the D and I caches, the system I/O bus, and the internal bus of the present invention with a number of bus units attached thereto.

Before proceeding with the specific description of the preferred embodiment of the invention there will first follow a brief description of the general architecture and data flow of a computer system architected along the lines of the PRISM architectural concept. The overall system is shown in FIGS. 1 and 2.

GENERAL DESCRIPTION OF HOST PRISM SYSTEM ARCHITECTURE

The heart of the previously referenced PRISM system is its Central Processing Unit (CPU). In fact, most of the other aspects of the system are designed to make available to the user the fundamental power of this engine. In addition to its CPU, the overall system consists of the main storage, cache facilities, relocate facilities, and system I/O (See FIG. 1). The cache is split into two parts, one for data, the other for instructions. (See previously referenced PCT U.S. patent application No. US82/01830.)

As stated above and in the referenced articles, the CPU architecture is a radically simpler alternative to the complex prior art mainframes. The major distinguishing characteristics of the present PRISM system architecture is that its instructions are designed to execute in a single machine cycle by hardware.

That is, every primitive instruction takes exactly one machine cycle, except for accessing storage, which will usually be overlapped. The term primitive as used herein, relates to time rather than simplicity of concept. Thus primitive is closely associated with the concept of a single machine cycle. That is to say the primitive instructions are those which are effectively executable within a single machine cycle although the actual functions may be relatively complex in terms of what actually takes place within the system hardware.

Going further, the term single machine cycle may be defined in a number of ways. Stated in one way a single machine cycle is the period of the basic system clock which continually repeats itself during the operation of the system and during which time basic system operations are performed. Stated in a somewhat different way a single machine cycle is the period of time necessary for the system to use the complete set of system clock pulses once, i.e, all of the pulses included in the basic clock period. Thus within a single machine cycle all of the CPU data flow facility may be used once.

Complex functions are implemented in the system via "micro-code" just as they are in conventional CPU's, except that in the PRISM system this microcode is just code; that is, the functions are implemented by software subroutines running on the primitive instruction set.

Using the concept of executing complex operations with code resident in cache, the number of cycles required to do a particular job is at worst no more than on a conventional (low-to-moderately priced) CPU in which the complex instructions have been microprogrammed. But by carefully defining the primitive instructions to be an excellent target machine for the compiler it is found that far fewer cycles are actually required on the CPU.

Thus the PRISM system architecture and its instruction set are the achievement of the following three pervasive strategies First a fast one-cycle per instruction CPU defined with an instruction set which was a good target for compilation. Next, an approach to the storage hierarchy, I/O, relocate, and software were developed to overlap these activities with CPU execution, so that it waits minimally.

Finally, an optimizing compiler was developed which produces code which is safe and efficient enough so that the system can be built to assume that all programs have been compiled by this compiler.

In addition to being executable in one machine cycle, the other overriding theme of the instructions is their regularity. This has helped to make the hardware implementation easier. For instance:

All operands must be aligned on boundaries consistent with their size (i.e., halfwords on halfword boundaries, words on word boundaries). All instructions are fullwords on fullword boundaries.

Register name fields are made five bits long so that 32 register implementations are possible when the technology makes this choice desirable. (This aspect of PRISM system architecture makes it feasible to use the system to emulate other architectures which have 16 GPR's, since 16 PRISM registers are still available for emulator use. A major problem with using the primitive subset of S/370 instructions for emulating complex instructions is the just described register name field restriction.)

Four byte instructions also allow the target register of every instruction to be named explicitly so that the input operands need not be destroyed. This is generally called a "three address" format.

The PRISM system is a true 32 bit architecture, not a 16 bit architecture with extended registers. Addresses are 32 bits long; arithmetic is 32 bit two's complement; logical and shift instructions deal with 32 bit words (and can shift distances up to 31).

The major components of the CPU shown in the data flow diagram of FIG. 2 are a two-input ALU, a five-port (3-output, 2-input) general purpose register file (32 registers of 32 bits each) and condition logic and the condition register. The condition register (CR) is a 32-bit register which reflects the effect of certain operations, and provides a mechanism for testing (and branching).

Tables 1(a) and 1(b) comprise a complete listing of the 32 bits in the condition register as well as their function in the overall CPU architecture. The setting and use of the bits of such a condition register is quite straightforward and well known to those skilled in the art.

TABLE 1(a)

Condition Register Bit Designation

| Bit | Name | Description |
|---|---|---|
| 0 | SO | Summary Overflow |
| 1 | OV | Overflow |
| 2 | LT | Compares Less Than, Negative Value |
| 3 | GT | Compares Greater Than, Positive Value |
| 4 | EQ | Compares Equal, Zero Value |
| 5 | LL | Logical Less Than |
| 6 | LG | Logical Greater Than |
| 7 | CA | Carry from bit 0 |
| 8 | C4 | Carry from bit 4 |
| 9 | C8 | Carry from bit 8 |
| 10 | C12 | Carry from bit 12 |
| 11 | C16 | Carry from bit 16 |
| 12 | C20 | Carry from bit 20 |
| 13 | C24 | Carry from bit 24 |
| 14 | C28 | Carry from bit 28 |
| 15 | CD | Carry from any 4-bit nibble |
| 16 | PZ | Permanent Zero |
| 17-25 |  | (Reserved for future use) |
| 26 | EC0 | External Condition 0 |
| 27 | EC1 | External Condition 1 |
| 28 | EC2 | External Condition 2 |
| 29 | EC3 | External Condition 3 |
| 30 | BB | Bus Busy (for Conditional Bus Operations) |

-continued

| Bit | Name | Description |
|---|---|---|
| 31 | HO | Halfword Overflow (overflow from lower 16 bits) |

TABLE 1(b)

Functional Description of the Bits in the Condition Register (Note: Bits not set by an instruction retain their old values.)

Bit 0 (SO) is the Summary-Overflow bit. Whenever an instruction sets the overflow bit to indicate overflow, it sets the SO bit to one, otherwise the SO bit is unchanged. (The use of overflow as a special indicator in divide step does not affect Summary-Overflow.)

Bit 1 (OV), the Overflow bit, is set to indicate that an overflow has occurred during an instruction operation. It is set to one on add and subtract instructions if the carry out of bit zero is not equal to the carry out of bit one. Otherwise it is set to zero. It also functions as a special purpose indicator for the Divide Step instructions. It is not altered by the compare instructions.

Bits 2-6 are set to indicate the computation result of the executed instruction.

Bit 5 (LL), the Logical-Less-Than bit, and

Bit 6 (LG), the Logical Greater-Than bit, are set considering the two operands as 32-bit unsigned integers. Bit 2 (LT), the Less-Than bit, Bit 3 (GT), the Greater-Than bit, and Bit 4 (EQ), the Equal bit, are set considering the two operands as 32-bit signed integers in two's complement representation.

Bits 2-6 are also set by the compare and logical instructions.

Bits 7-14 indicate carry outs of each nibble in the ALU.

Bit 7 (CA), the Carry bit, is set to indicate a carry from bit 0 of the computed result. On add and subtract instructions it is set to one if the operation generates a carry out of bit 0. If there is no carry out it is set to zero. It also functions as a special-purpose indicator for the Divide and Multiply instructions. It is not altered by the compare instructions.

Bit 8 (C4) is set to 1 if there is a carry out of bit 4. It is set to 0 if there is no carry out.

Bits 9-14 (C8-C28) are set similarly. These carries are provided to assist in performing decimal arithmetic.

Bit 15 (CD) is set to 1 if there is a carry out of any 4-bit nibble. Otherwise it is set to 0. Programming note: CD can be used to verify that all of the decimal digits in a number are valid.

Bit 16 (PZ) is the permanent-zero bit. It is always zero and it cannot be reset to one. Its presence provides for an unconditional branch by use of the Branch False instruction, where the permanent zero bit is specified.

Bits 17-25 are reserved bits. They are implemented but are not modified by any conditions in the PRISM. These bits of the condition register can be arbitrarily set by the Load Condition Register instruction. Subsequent fetches or tests will reflect those values.

Bits 26-29 (EC0 through EC3), External Condition Bits. These bits are set to the values of the corresponding CPU inputs EXT-COND-0 through EXT-COND-3 when the EXT-COND-VALID is active.

Bit 30 (BB), the Bus Busy bit, is set to 1 if a CBO, CBOU, or CBOI instruction could not be executed by a bus unit because it was busy, otherwise it is set to zero for those instructions. It is unchanged by other instructions.

Bit 31 (HO), the Halfword Overflow bit, is set to indicate that an overflow on the lower 16 bits has occurred during an instruction operation. It is set to one on add and subtract instructions if the carry out of bit 16 is not equal to the carry out of bit 15. Otherwise it is set to zero. It is not altered by the compare instruction.

The MQ register is a 32-bit register whose primary use is to provide a register extension to accommodate the product for the Multiply Step instruction and the dividend for the Divide Step instruction. It is also used as an operand storage location for long shift and rotate and store instructions.

The Instruction Register is a 32-bit register which is quite conventional in nature. The following instruction formats illustrated in Table 2(a) are utilized in the system.

The instruction address register is conventional in nature and points to the location in memory where a desired instruction is resident.

The Mask and Rotate (M&R) Logic block contains the logic circuitry necessary to perform the M&R instructions specifically disclosed and described in previously referenced, filed U.S. patent application Ser. No. 509,836 (Y0983011).

The Condition Logic and Condition Register is conventional to the extent that the setting of the various bits therein is required as the result of specified conditions which do or do not occur as a consequence of various system operations. Details of the particular condition register architecture utilized in the herein disclosed preferred embodiment of a PRISM system architecture are set forth and described in previously referenced, filed U.S. patent application Ser. No. 509,744 (Y0983-009).

Both the Data and Instruction Cache Interfaces provide paths for providing instruction addresses and data between the two caches and the CPU. Details of the operation of these caches are set forth in previously referenced, filed PCT application Ser. No. US82/01830.

All instructions are four bytes long and are located on fullword boundaries.

Bits 0–5 always specify the op code. For some instructions, bits 21–31 specify extended op codes.

The remaining bits contain one or more of the following fields, in the indicated bit positions:

TABLE 2(a)

Instruction Formats

D-form, UL-form

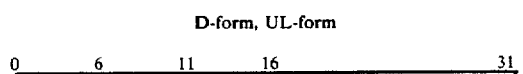

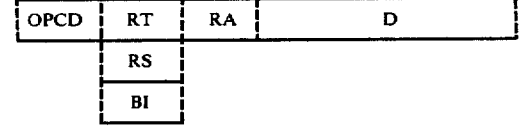

M-form

X-form

-continued

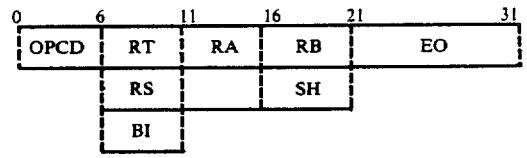

Table 2(b) contains a definition of the various instruction fields used in the instruction formats illustrated in Table 2(a).

TABLE 2(b)

OPCD (0–5)

The basic op code field of the instruction.

RT (6–10)

Name of the register used as the "target" to receive the result of an instruction.

RS (6–10)

Name of the register used as a source for an instruction.

RA (11–15)

Name of the register used as the first operand or as the target for rotate instructions.

RB (16–20)

Name of the register used as the second operand.

BI (6–10)

Immediate field specifying a register bit or a trap mask.

SH (16–20)

Immediate field specifying a shift amount.

D (16–31)

Immediate field specifying a 16-bit signed integer in two's complement notation. When this field is used with other fields that are 32-bits in length the D field is always sign extended.

MASK (21–31)

Immediate field specifying a 32-bit string, consisting either of a substring of ones surrounded by zeros or a substring of zeros surrounded by ones. The encoding is as follows:

Bit 21

0=ones surrounded by zeros
1=zeros surrounded by ones

Bits 22–26

Index to leftmost bit of substring

Bits 27–31

Index to rightmost bit of substring

A mask field of '10000011111' generates an all zero mask. A mask field of '00000011111' generates an all one mask. The result of specifying an invalid mask (i.e., first index greater than last index) is undefined.

EO (21–31)

The extended op code.

The four previously referenced applications filed, all relate to specific hardware enhancements which render such a PRISM system more efficient.

General Description of the Internal Bus Architecture/Mechanism

The present internal bus architecture/mechanism may be used with a CPU that has the following logical buses to storage:

A command bus to describe the function requested,
an address bus,
a source data bus for Store,
a target data bus for Loads.

As stated previously, it has been found that other functions can be implemented outboard of the CPU and attached to the CPU via these same buses (e.g., floating point). To accomplish this end these buses were made available to the CPU by means of an instruction, which shall be generally referred to herein as an Internal Bus Operation (IBO). This instruction has operands to name the following:

The bus unit being requested,
the command
the two operands (B,D, or B,X) which will be added to produce the output on the address bus,
the source register,
the target register, if needed, and three flags:
privileged command or not, (1 bit)
target register required or not, (1 bit)
address bus sent back to BASE register, or not, (1 bit)

Having defined this generic IBO instruction, unit names are given to the instruction and data caches, the external interrupt controller, the timer, and the relocate controller. The IBO op code was assigned to all instructions directed to these units.

With the Conditional Bus Operation (CBO) class of instructions, data is placed on the Internal Bus and the CPU stops until a device responds with 'CBO Acknowledge'. Here, the assumption is made that the device has completed the requested operation before responding or has set the busy bit in the condition register when responding.

With the Pipelined Bus Operation (PBO) class of instructions, data is placed on the Internal Bus for one cycle and the CPU continues operation without waiting for a response of any kind from the device. A protocol has been established to avoid contention and collisions on the Internal Bus. Multiple PBO's to different devices may be active; a second PBO to the same device that has not completed a prior PBO will cause the CPU to stop until that device has completed the first one.

To comment on the special case of a PBO addressing a non-existent device, each device is expected to recognize when a PBO is transmitted over the Internal Bus and determine when a valid response has been generated. If a device is addressed, and it knows that a previous PBO has not been responded to, it does not respond to the PBO request.

The CPU architecture is organized so that, while the CPU is expected to decode and execute the instructions defined for the CPU, many additional facilities can be provided which will be executed by other components of the system. These components, called 'Bus Units', are attached to the CPU in the herein disclosed embodiment by the A-Bus, B-Bus, C-Bus, and the T-Bus. These busses are used for specific purposes such as data transfers to and from storage, but in addition are components of the CPU Internal Bus. The CPU Internal Bus is a collection of lines described subsequently. Much of the complexity of the Internal Bus data transfer protocol is due to the requirement that the A, B, C, and T bus coexist (actually coextensive) with the Internal Bus. In other words the use of the bus for the simple transferral of data between the CPU and memory will not require such a detailed protocol.

Many computer systems use busses of one type or another, and bus definitions with their required hardware are common. The present Internal Bus architecture is different in that it is specifically aimed at increasing system flexibility while at the same time maintaining performance. Most computer instruction sets identify a number of different instructions for specific functions, such as interrupt control, memory management, and other functions that are performed external to the CPU itself. In the case of the presently described PRISM system, an Internal Bus has been conceived and a limited set of instructions defined to use this Internal Bus. This Internal Bus now provides an extremely effective and extendable mechanism for communications between the CPU and its associated devices. It accomplishes this by providing a common command structure for data and command transfers to a device without limiting or interpreting that data and command. This allows arbitrary devices to be added easily.

The present Internal Bus architecture is intended to allow communication between the CPU and devices used to extend the effectiveness of the CPU. Other busses allow communication between the CPU and 'external' devices, such as a printer or a disk drive, while the system Internal Bus allows connection to extensions to the CPU, such as a Floating Point unit, Processor, and timers. It shares busses needed for data and address transfer to and from the Data Cache, coexisting with the protocol for Fetching and Storing data. The Internal Bus allows a device to be very tightly coupled with the system data flow.

A bit (BB) in the Condition Register is allocated to provide status information for CBO type of Internal Bus instructions. It is set to 1 if an Internal Bus instruction could not be executed by a device because it was busy. If the device could accept the Internal Bus instruction, the BB bit is set to 0. Some functions of some devices can be guaranteed to execute, for example, a command to load data into a certain device register. Two Internal Bus commands have been defined. The first command, the Conditional command, checks for the presence of Device Busy and sets the BB bit accordingly. The second command is the pipelined command. Both of the commands will be described more fully subsequently.

A timer associated with the Internal Bus is set to cause an interrupt if no device responds within a specified period of time.

DETAILED DESCRIPTION OF THE INTERNAL BUS ARCHITECTURE/MECHANISM

In the following description only those portions of the CPU will be described which are deemed releVant to the operation of the herein disclosed internal bus mechanism. All CPU operations described generally are deemed to be well knoWn to those skilled in the art. It is particularly to be observed that while the present internal bus architecture mechanism has specific utility in a primitive reduced instruction set machine architecture it would have similar applicability in any CPU having the same general internal bus configuration and having an instruction format and decoder capable of or modifiable to recognize such special internal bus operation instructions.

For a further description of the overall CPU architecture of such a PRISM system reference should be made to the four applications listed previously in the specification.

For a detailed description of the operation of the Data Cache, the Instruction Cache, and the Relocation-Mechanism which are connectable to the CPU and operable as Bus Units via the internal bus, reference should be made to the previously filed PCT U.S. patent application Nos. US82/01830 and US82/01829, also referenced previously.

In the herein described preferred embodiment of the invention the host PRISM system CPU is designed to have two protocols for communications to devices. For Conditional Bus Operations (CBO) instructions, the CPU uses the CBO Protocol and waits for device response (CBO ACKNOWLEDGE) before continuing instruction execution. For Pipelined Bus Operation (PBO), Load, or Store instructions, the CPU uses the PBO Protocol and monitors the device status to conditionally continue instruction execution. (Device status is the state UNIT BUSY AND UNIT ACKNOWLEDGE.)

The CBO Protocol is provided so devices do not have to save the state of the A BUS, B BUS, and C BUS. Recovery and device busy status are handled by software.

The PBO Protocol is provided for Load and Store instructions, and so devices can complete their operations while the CPU continues instruction execution. Recovery information is provided by the device (if necessary) and busy status is handled by hardware.

When using the PBO Protocol, the CPU activates the PBO REQUEST line and, if all devices are idle, continues instruction execution. The device must save the state of the A BUS, B BUS, C BUS, and whether PBO REQUEST or DATA REQUEST was active. These parameters must be saved for executing the operation.

The device continuously transmits its status to the CPU and monitors the status of other devices. Continued instruction execution by the CPU and device start are dependent on the state of the device status lines and the CPU output lines.

Two types of responses are possible, Basic and Auxiliary. The Basic Responses are either UNIT BUSY or UNIT ACKNOWLEDGE. The Auxiliary Responses are the same as the Basic Responses except that UNIT ACKNOWLEDGE is made active for the first cycle of a multi-cycle op.

If data is to be returned to the CPU, T BUS VALID must be made active while UNIT BUSY or UNIT ACKNOWLEDGE is active.

The Basic Responses provide the CPU with the device status information that allows the CPU to continue or halt instruction execution when a Load, Store, or PBO Instruction is decoded. If instruction execution has been halted because UNIT BUSY is active, there is no Basic Response that allows the CPU to continue instruction execution until all the device status lines go inactive.

In a multi-device environment, an idle device is capable of starting an operation when another device signals UNIT BUSY (i.e., signaling the CPU to halt instruction execution). The Auxiliary Responses are used to tell the CPU that a device has accepted the PBO REQUEST and to continue instruction execution. The Auxiliary Response cannot be used to release the CPU when Data Store is busy and DATA REQUEST is active. It is only intended for starting idle devices.

When a device uses any one of the Auxiliary Responses, it cannot respond to a PSO on two successive cycles. The reason for this restriction is that when the device sees the UNIT BUSY line active and decides to use the Auxiliary Response, the CPU also sees the UNIT BUSY line and holds the PBO instruction for another cycle. If the device responded to a PBO on the next cycle it would be the same PBO that it had just executed.

All devices the use the PBO Protocol are required to provide the Basic Responses. Provision for Auxiliary Responses (in addition to the Basic Responses) is recommended, but is optional.

Load and Store Instructions use the PBO Protocol as described above, except that DATA STORAGE REQUEST is made active (instead of PBO REQUEST).

BASIC CBO PROTOCOL

When using the Conditional Bus Operation (CBO) Protocol, the CPU activates the CBO REQUEST line and waits for CBO ACKNOWLEDGE from the Device. CBO ACKNOWLEDGE may be activated in the same cycle as CBO REQUEST. (If the CBO REQUEST is for data from the Device, T BUS VALID cannot be activated in the same cycle as CBO REQUEST). If the Device does not activate CBO ACKNOWLEDGE within sixty-four cycles, the CPU takes a Program Check Interrupt.

The CPU does not change its output until either CBO ACKNOWLEDGE is activated or the CPU takes a Program Check Interrupt because there has been no response in sixty-four cycles.

If the Device is busy and cannot accept the CBO REQUEST, the Device may activate CBO ACKNOWLEDGE and CBO BUSY. The CBO Busy bit is set in the Condition Register and the CPU continues instruction execution. If the CBO REQUEST was for data to be returned to the CPU, the request is cancelled and the CPU does not wait for the Device to return data. CBO ACKNOWLEDGE and CBO BUSY may be activated in the same cycle as CBO REQUEST (See FIG. 12 and FIG. 13).

Software must test for the CBO Busy Bit to see if the Device executed the CBO Command.

CBO DEVICE DISCONNECT

If the Device is going to be busy for a long time, the Device may activate CBO ACKNOWLEDGE to release the CPU. The CPU expects that the operation will be completed and, if the CBO REQUEST was for data to be returned to the CPU, the CPU will wait (if necessary) for the Device to return data. CBO ACKNOWLEDGE may be activated in the same cycle as CBO REQUEST.

The Device must save the state of the A BUS, B BUS, and the C BUS for executing the operation.

OVERALL CPU SYSTEM CONSIDERATIONS

The CPU must implement the PBO Protocol for Load and Store instructions. The Basic and Auxiliary Responses function as described previously.

Whether or not a device (Bus Unit) implements the CBO Protocol or the PBO Protocol depends on how much it is worth to allow the CPU to continue executing instructions while the deVice decodes its address and while the device sees if the operation code is valid before it activates CBO ACKNOWLEDGE.

When executing a PBO Bus operation, the Device Status lines must be monitored and capable of being activated by each device, therefore, these lines are bi-directional at the device.

If a device uses the CBO Protocol, one consideration is whether or not the device can execute all commands in less than sixty-four cycles. If the device can, it may not be desirable to use the CBO BUSY line because it takes time and code to issue the CBO REQUEST, then see if the CBO BUSY bit was set in the Condition Register and then reissue the CBO REQUEST if necessary. The CPU registers can be used to hold data during the operation until CBO ACKNOWLEDGE is made active. Devices using the CBO Protocol do not have to monitor any lines to see if they can begin an operation when CBO REQUEST is active.

MIXED CBO AND PBO PROTOCOL

Devices that use the PBO Protocol and Devices that use the CBO Protocol can be mixed in the same system.

The CPU has the responsibility of monitoring Device Status for CBO Protocol; the CPU and the Devices have the responsibility of monitoring Device Status for PBO Protocol.

The internal bus connects the CPU, data storage and various bus units as may be seen in FIG. 3. The bus is used by load and store instructions for data transfer between the CPU and data storage, and by CBO or PBO instructions to communicate with various bus units.

Figure 4:
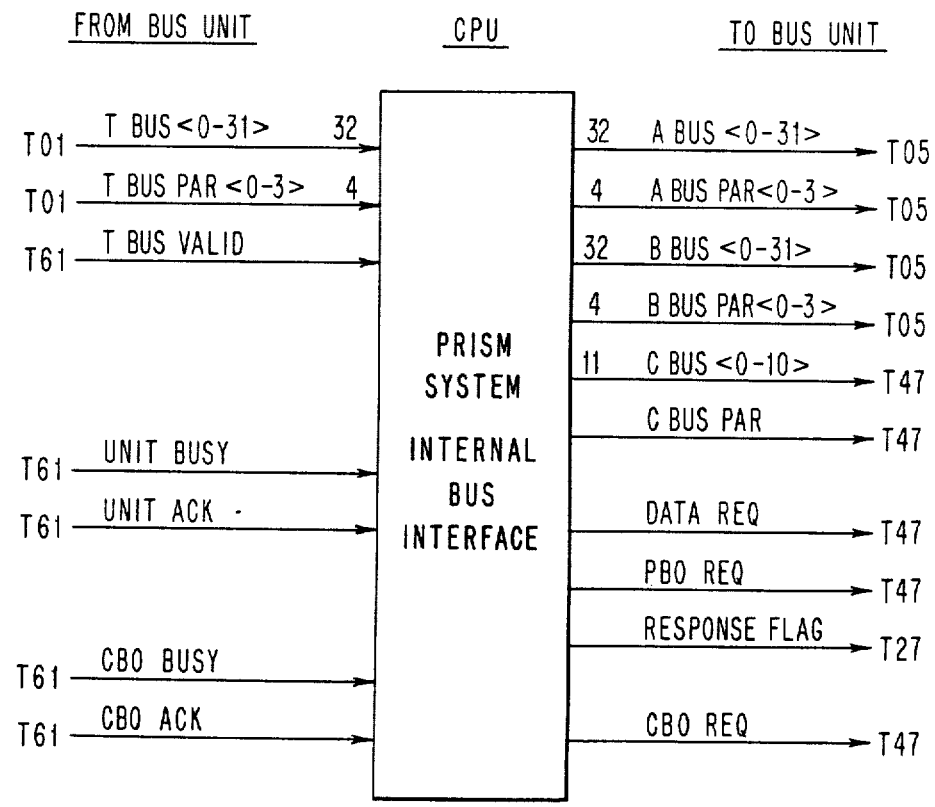
FIG. 4 comprises a chart of the present internal bus interface showing the basic data transfer operations.

The following is a description of all of the lines entering and exiting the CPU which constitute the system Internal Bus as shown in FIG. 4. Included is the system mnemonic for the lines, the number of lines involved, i.e., <0–31>, and a functional description of the precise operation performed by the particular bus, as well as the type of data transferred over same. The letter "T" followed by a number adjacent the line designation relates to the system clock sequences.

The basic system clock which controls the PRISM system is assumed to consist of a basic machine cycle, as described previously, which is broken into 8 sub-cycle units. In the following description and drawings expressions T0, T47 and T63 refer to timing events which occur during a particular time frame within the basic machine cycle as will be readily understood by those skilled in the art. Thus, an event which occurs at time T6 begins at the beginning of the sixth sub cycle and terminates at the end of the sixth sub cycle. In other words it is on for ⅛th of a cycle.

An expression such as T47 means that an event begins at the beginning of the fourth clock pulse and ends at the end of the seventh pulse. The total time or duration of the event is one half of the total machine cycle, i.e., through sub clock pulses 4, 5, 6 and 7.

| INPUT LINES | |
|---|---|
| T BUS <0–31> | T01 |
| T BUS PAR <0–3> | T01 |

This bus carries data and parity from data storage and from the bus units to the CPU

—T BUS VALID

This input line indicates that the data on —T BUS is valid during T01 and may be loaded into the CPU.

—CBO ACK

This input line indicates that a bus unit has recognized a CBO command. It should be activated once for each CBO request.

If this signal is not returned in the cycle following —CBO REQ, the command will continue to be presented and the CPU will proceed with a 64-cycle time-out.

—CBO BUSY

The state of this line is set into the BB bit of the Condition Register when —CBO ACK is active. A value of 1 indicates that the CBO request could not be executed by the bus unit, while a 0 indicates that the command has been accepted.

—UNIT BUSY

This line is used to indicate that a bus unit is unable to complete a DATA request or PBO request in one machine cycle.

—UNIT ACK

This signal is used to indicate that a unit has accepted a data storage or PBO request. Under certain circumstances, it also signifies that a unit has completed a request. (See PBO Operation, below)

| OUTPUT LINES | |
|---|---|
| A BUS <0–31> | T05 |
| A BUS PAR <0–3> | T05 |

The A Bus is used to transfer addresses for a data storage request from the CPU to data storage. It is also used to transfer data from the CPU to bus units during CBO or PBO instructions.

| | |
|---|---|
| B BUS <0–31> | T05 |
| B BUS PAR <0–3> | T05 |

The B bus is used to transfer data from the CPU to data storage. It is also used to transfer data from the CPU to bus units during CBO or PBO instructions.

| | |
|---|---|
| C BUS <0–10> | T47 |

This bus is used to send address and operation information during CBO and PBO instructions, and to send storage-related information during load and store instructions.

For a load or store instruction, —C BUS carries storage-related information as follows:

—C BUS

| 0 | 1 | 2 | 3 | 4 | 5 | 6 | 7 | 8 | 9 | 10 |
|---|---|---|---|---|---|---|---|---|---|---|
| i21 | i22 | i23 | i24 | i25 | a | b | c | d | u | l | i<21–25> bits 21–25 of the instruction, respectively.

-continued a,b,c,d   mark bits, corresponding to bytes C0, C1, C2 and C3, respectively, of —B BUS; 1 if the byte is to be stored; 0 otherwise.

u   1 if the instruction being executed is Load Unrelocated or Store Unrelocated; or if MSR11 = 0 and the instruction being executed is not Load Indirect (LIX); 0 otherwise l   if the operation is a load; 0 otherwise.

For all other instructions, including CBO or PBO, —C BUS has the following format:

```
                         —C BUS 0   1   2   3   4   5   6   7   8   9   10
 ===========================================
  i21 i22 i23 i24 i25 i26 i27 i28 i29 i30 i31
 ===========================================
``` i<21-31>   bits 21-31 of the instruction, respectively.

—C BUS PAR

This parity bit provides odd parity over the —C BUS.

—DATA REQ T47

This output line indicates that the CPU is executing a load or store instruction and that the appropriate information associated with the data storage request is on the —C BUS and subsequently on the —A BUS and on the —B BUS.

—PBO REQ T47

This output line indicates that the CPU is executing a PBO instruction and that the appropriate information associated with the PBO request is on the —C BUS and subsequently on the —A BUS and on the —B BUS.

—RESPONSE FLAG T27

This signal becomes active for one cycle whenever the immediately preceding instruction was a load, store or PBO and the CPU is expecting a unit response.

This line is used to indicate the state of the CPU to the bus units. Each unit uses this information, together with the status of —UNIT BUSY and —UNIT ACK to decide whether or not to start a requested operation.

—CBO REQ T47

This output line indicates that the CPU is executing a CBO instruction and that the appropriate information associated with the CBO request is on the —C BUS and subsequently on the —A BUS and on the —B BUS.

INTERNAL BUS OPERATION

The following constitutes a general overview of the present Internal Bus operations. For further details, refer to the subsequent detailed description.

When a load, store, PBO or CBO instruction is being executed, the CPU signals the appropriate request and puts information regarding the type of operation on —C BUS. Subsequently, the CPU puts appropriate information on —A BUS and —B BUS.

For load (and for read-type CBO and PBO) instructions, the requested data will subsequently become available on —T BUS. While waiting for this data, the CPU will normally continue to execute other instructions. A T-BUS interlock is incorporated into the CPU, however, so that the CPU will subsequently hold and inhibit a request if either (a) it needs the forthcoming data to execute another instruction, or (b) if a subsequent instruction requires use of the T-BUS while a previous request is still outstanding (except in the case where a previous request was a load and the following instruction is a load).

Differences in the details of the operation of CBO, PBO and data storage instructions will now be described.

CBO OPERATION

When a CBO instruction is being executed, the CPU puts the appropriate information on —C BUS and signals —CBO REQ. Appropriate data is subsequently presented on —A BUS and —B BUS.

The instruction is held in the Instruction Register until the bus unit responds to the command with CBO ACK. Until this response occurs, the CPU will continue to present the CBO command and will advance a timeout. When the response is received, the state of —CBO BUSY will be latched into the BB bit of the Condition Register and instruction execution will resume. If no response is received in 64 cycles, the CPU will take a program check interrupt as will be understood by those skilled in the art.

The T-BUS interlock will not be set for a CBO-read if the bus unit responds with —CBO BUSY, nor will it be set if the bus unit simultaneously signals —CBO ACK and —T BUS VALID.

PBO AND DATA STORAGE OPERATION

Both PBO and Data Storage operations make use of many of the same interface signals. The essential difference is that PBO operations require, in addition to the request signal, that a bus unit address be sent on —C BUS. In all cases, —C BUS indicates the direction and characteristics of the transfer.

When a PBO (load/store) instruction is loaded into the Instruction Register, the CPU puts appropriate information on —C BUS and signals —PBO REQ (—DATA REQ). Subsequently, information is put on —A BUS and —B BUS to complete the operation. The CPU will then load the next instruction if all bus units are idle (i.e., if all of the following lines are inactive: —DATA INTRP REQ, —DATA INTRP POSS, —UNIT ACK and —UNIT BUSY).

During the cycle immediately following the execution of any PBO (load/store) instruction, the CPU may require a response to the request, as indicated by the signal —RESPONSE FLAG. If all units are found to be idle, the CPU then initiates a Program Check Interrupt, Alternatively, if —UNIT BUSY is active and the current instruction is a PBO (load/store), the CPU will enter the hold state.

Whenever the CPU enters the hold state because a bus unit is busy, it remains in that state while —UNIT BUSY is active and —UNIT ACK is inactive. The CPU will execute the held instruction when (1) —UNIT ACK is active or (2) when all devices are idle. Only in the latter case will the CPU expect a response in the following cycle.

Bus Operation Instruction Format

Bits 0-5 always specify the op code. The bits contain one or more of the following fields, in the indicated bit positions.

| 0 | 6 | 11 | 16 | 21 | 31 |
|---|---|---|---|---|---|
| OPCD | RT | RA | RB | BU | PR |

OPCD (0-5)

The basic op code field of the instruction.

RT (6-10)

Name of the register used as the "target" to receive the result of an instruction.

RA (11-15)

Name of the register used as the first operand.

RB (16-20)

Name of the register used as the second operand.

BU (21-29)

Immediate field which is placed on the C-BUS for Bus Operation instructions. The use of this field is dependent on the system designer's choice. In the present System architecture bits 21-25 specify the unit operation and bits 26-29 the bus unit designation.

P (30)

For Bus Operation instructions, a one specifies that the instruction can only be executed in privileged state, a zero that it can be executed in non-privileged state.

R (31)

For Bus Operation instructions, a one specifies that the operation will return a value into RT, a zero that no value will be returned.

It should be noted in passing that the following interrupts would be operated by the Internal Bus control mechanism when the following situations arise:

CBO Time-out

A CBO Time-out Program Interrupt is generated when no unit on the Internal Bus responds to the processor within 64 cycles of a CBO, CBOI or CBOU instruction.

PBO Time-out

A PBO Time-out Program Interrupt is generated when no unit on the Internal Bus responds to the processor after a data or PBO-request.

As will be well understood by those skilled in the art when such an interrupt occurs certain remedial actions may be taken such as a retry, or in some circumstances the program would abort.

Bus Instructions

The PRISM CPU architecture is defined so that, while it is expected to decode and execute the normal internal operations, many additional facilities are provided in accordance with the present invention which will be executed by other components of the system called "Bus Units". These are attached to the CPU by the A-BUS, B-BUS, C-BUS, and T-BUS.

Instructions to these components are in the BO-form and have one of six Bus Operation op codes (04, 05, 07, 08, 27, 47). When the CPU encounters an instruction with one of these op codes it proceeds as follows:

If the P (privileged) field in the instruction is a 1 and the PR bit the Machine State Register (MSR) is a 1, a Privileged Instruction Program Interrupt will be taken.

The CPU will send out to the Bus Unit the following data:

1. The contents of register RT will be put on the B-BUS.
2. The sum $(RA|0)+RB$ will be put on the A-BUS.
3. The BU-Field of the instruction, the P-field and R-field will be put on the C-BUS.

For update instructions the sum $(RA|0)+RB$ will be loaded into RA.

If the R field is a 1, 32 bits of data will be returned from the Bus Unit (on the T-BUS) and loaded into register RT. If R is zero, no data will be returned.

For PBO instructions, the condition register will remain unchanged. For CBO instructions, the CPU will receive a response from the Bus Unit as to whether the command has been accepted. If the Bus Unit has accepted the command the BB (Bus Unit Busy) bit in the condition register is set to zero. If the Bus Unit has not accepted the command the BB bit is set to one.

The way in Which the BU-field is used is optional. One possible configuration of the BU-field is: bits $0-4=$ the Bus Unit command, and bits $5-8=$ the Bus Unit address.

CONDITIONAL BUS INSTRUCTIONS

Conditional Bus Operation

CBO   RT,RA,RB,BU,P,R

| 0 | 6 | 11 | 16 | 21 | 31 |
|---|---|---|---|---|---|
| 05 | RT | RA | RB | BU | PR |

The contents of register RT, the sum $(RA|0)+RB$, and the BU-, P- and R-fields of the instruction are sent out on their respective busses. If R is a 1, the data returned from the unit is stored in register RT. If R is a 0, the unit will not return any data.

If P is a 1 and the problem state bit in the MSR is a 1, a program check interrupt will occur and the instruction will not be sent to the Bus Unit.

If the unit does not respond a CBO time-out program interrupt will be generated.

If the bus unit accepts the operation the BB bit of the Condition Register is set to zero. If the unit is busy and does not accept the operation, the BB bit is set to one and instruction is treated as a No-OP.

Condition Codes:
Set: BB

Condition Bus Operation with Update

CBOU   RT,RA,RB,BU,P,R

| 0 | 6 | 11 | 16 | 21 | 31 |
|---|---|---|---|---|---|
| 07 | RT | RA | RB | BU | PR |

The contents of register RT, the sum $(RA|0)+RB$, and the BU-, P- and R-fields of the instruction are sent out on their respective busses, and the sum $(RA|0)+RB$ is also placed in register RA. If R is a 1, the data returned from the unit is stored in register RT. When RT and RA are specified as the same register, RT will contain the value returned from the external unit and not the computed sum. If R is a 0, the unit will not return any data.

If P is a 1 and the problem state bit in the MSR is a 1, a program check interrupt will occur and the instruction will not be sent to the Bus Unit.

If the unit does not respond a CBO time-out program interrupt will be generated.

If the bus unit accepts the operation the BB bit of the Condition Register is set to zero. If the Unit is busy and does not accept the operation, the BB bit is set to one and instruction is treated as a No-OP.

Condition Codes:
Set: BB

PIPELINED BUS INSTRUCTIONS

Pipelined Bus Operation

PBO     RT,RA,RB,BU,P,R

```
0      6    11   16   21       31
| 08 | RT | RA | RB | BU | PR |
```

The contents of register RT, the sum (RA|0)+RB, the BU-, P- and R-fields are sent out on their respective busses. If R is a 1, the data returned from the unit is stored in register RT. If R is a 0, the unit will not return any data.

If P is a 1 and the problem state bit in the MSR is a 1, a program check interrupt will occur and the instruction will not be sent to the Bus Unit.

If the unit does not respond, a PBO time-out program interrupt will be generated.

Condition Codes:
Set: None

Pipelined Bus Operation with Update

PBOU     RT,RA,RB,BU,P,R

```
0      6    11   16   21       31
| 04 | RT | RA | RB | BU | PR |
```

The contents of register RT, the sum (RA|0)+RB, the BU-, P- and R-fields are sent out on their respective busses, and the sum (RA|0)+RB is also placed in register RA. If R is a 1, the data returned from the unit is stored in register RT. When register RT is the same as RA, RT will contain the value returned from the external unit and not the computed sum. If R is a 0, the unit will not return any data.

If P is a 1 and the problem state bit in the MSR is a 1, a program check interrupt will occur and the instruction will not be sent to the Bus Unit.

If the unit does not respond, a PBO time-out program interrupt will be generated.

Condition Codes:
Set: None

The following CPU Data Cache instructions are typical, although by no means exhaustive, of instructions which may be implemented using an IBO instruction selecting the Data Cache Control DEVICE as a Bus Unit. Reference should be made to copending PCT U.S. patent application No. US82/01830 for a more complete description of such instructions.

Store Data Cache Line, Cache Form
Store Data Cache Line, SID Form
Store Data Cache Line, Line Form
Store and Synchronize Data Cache Line, Cache Form
Store and Synchronize Data Cache Line, SID Form
Store and Synchronize Data Cache Line, Line Form
Flush Data Cache Line, Cache Form
Flush Data Cache Line, SID Form
Flush Data Cache Line, Line Form
Flush and Synchronize Data Cache Line, Cache Form
Flush and Synchronize Data Cache Line, SID Form
Flush and Synchronize Data Cache Line, Line Form
Set Data Cache Line, Line Form
Invalidate Data Cache Line, Cache Form
Invalidate Data Cache Line, SID Form
Invalidate Data Cache Line, Line Form
Load Cache Configuration Register
Load From Cache Configuration Register
Load Data Segment Register
Load From Data Segment Register
Load Data Page Table Entry Address
Load Page Frame Accessed Vector
Load Page Frame Modified Vector
Load From Page Frame Modified Vector The following CPU Instruction Cache instructions are typical of those Which may be implemented using an IBO or IBOI instruction selecting the Instruction Cache Control DEVICE.

Load Instruction Segment Register
Load From Instruction Segment Register
Invalidate Instruction Cache Line, Cache Form
Invalidate Instruction Cache Line, SID Form
Invalidate Instruction Cache Line, Line Form

DESCRIPTION OF THE PREFERRED HARDWARE MECHANISM FOR EFFECTING THE PRESENT INTERNAL BUS ARCHITECTURE

Since the present invention resides primarily in the novel structural combination and the method of operations of well-known computer circuits and devices, and not in the specific detailed structure thereof, the structure, control, and arrangement of these well-known circuits and devices are illustrated in the drawings by use of readily understandable block representations and schematic diagrams, which show only the specific details pertinent to the present invention. This is done in order not to obscure the disclosure with structural details which will be readily apparent to those skilled in the art in view of the description herein. Also, various portions of these systems have been appropriately consolidated and simplified to stress those portions pertinent to the present invention. In the subsequent description of the preferred embodiment of the invention as set forth and disclosed in the drawings, it should be understood that FIGS. 1 and 2 (2A and 2B) constitute an architectural definition of a PRISM type computer system in which the present invention has particular utility.

FIGS. 3 through 8 comprise a specific description of such an internal bus architecture per se which could, of course, be used with other more general computer architectures.

Referring to FIG. 1 an overall organizational block diagram of a typical PRISM system architecture is shown. The CPU 12 is depicted as a separate unit, however, it will be understood that the internal bus 10 is actually a composite member of the basic CPU architecture. Specific units shown directly attached to the internal bus 10 are the floating point unit 14 and a block designated other bus units 16 which, as will be readily understood, may comprise a plurality of different units separately attached to the bus 10. The instruction cache 18 and data cache 20 are also illustrated as connected to the internal bus and thus operable under various internal bus operation instruction formats (described previously). A system bus unit 22 is also shown connected to the internal bus which would primarily perform the function of system I/O operations to and from main storage as will be understood by those skilled in the art. No specific instructions for controlling the system bus unit are described herein, however, operation instructions to control such a system bus unit are well known and would be obvious to those skilled in the art.

Figure 2A:
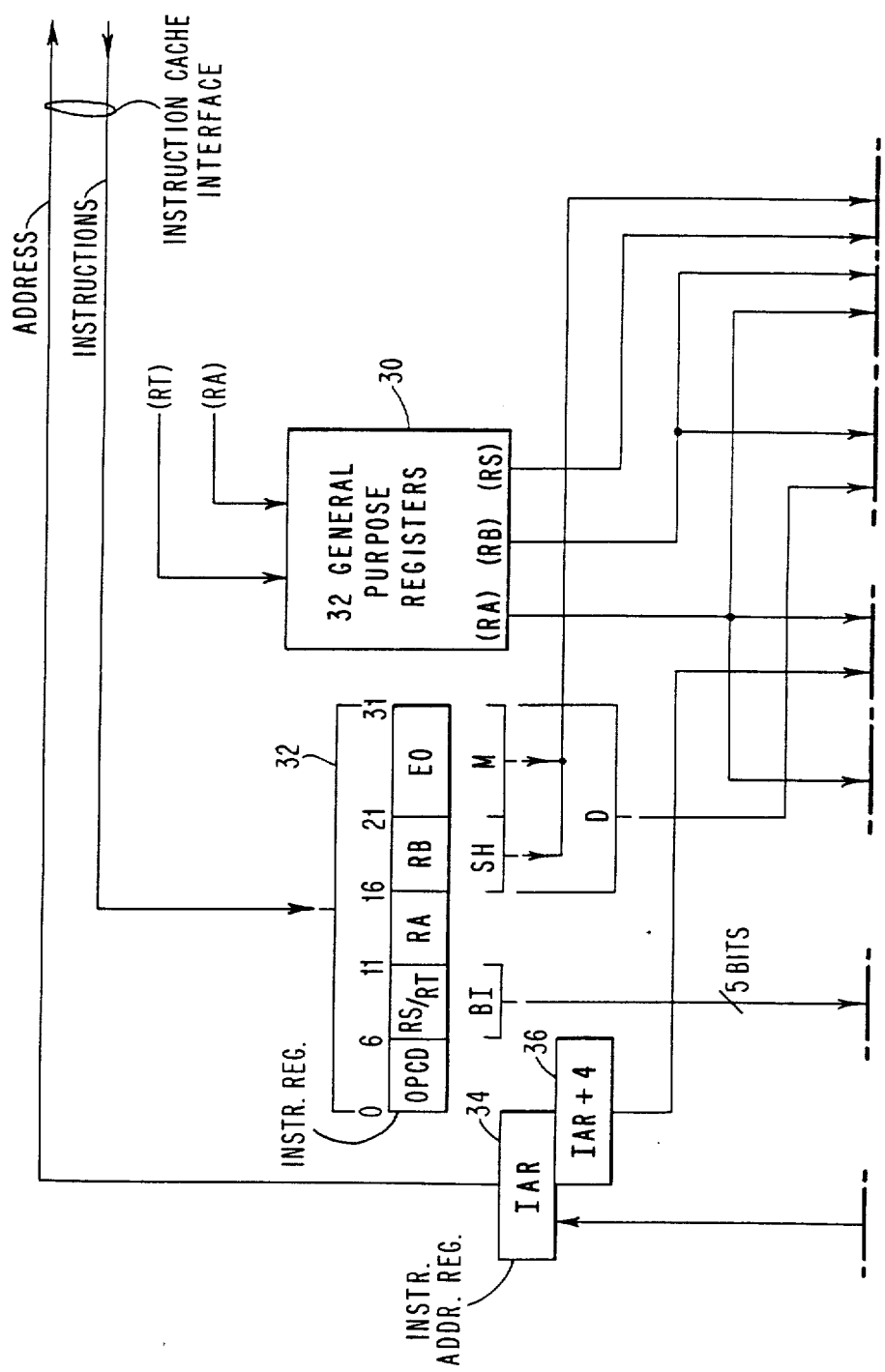

FIGS. 2A and 2B form a composite functional block and data flow diagram for the PRISM CPU. These two figures are organized as shown in the organizational diagram of FIG. 2.

The data flow within the basic PRISM organization is clearly shown in FIGS. 2A and 2B.

As stated previously in the general description of the PRISM system, the basic CPU includes a five port general purpose register block 30 containing thirty two individual registers. The two inputs to the register block RT and RA as well as the three outputs RA, RB, RS indicate the particular instruction designated operands set forth in the previous description of the instruction formats. As will be apparent to those skilled in the art, the (address of the) particular general purpose register in which the various operands are to be stored or from which they are to be fetched would be specified in the various fields of the instruction register.

The organization of the instruction register 32 is straightforward. It should be noted that this is a 32-bit register with the various delineated fields within the register clearly shown in the drawing (designated bits) as well as the mnemonic representations of the various fields as used in the previously described instruction formats. The designated BI, SH and M beneath the primary instruction register box 32 indicates the mnemonic representation given to these fields in certain of the instructions. However it should be understood that these are shown outside of the instruction box for convenience of reference only.

The instruction address register (IAR) 34 is also conventional in nature and would be initially loaded at the beginning of a program and suitably incremented or reloaded by the program subsequently as required. Block 36 labeled (IAR +4) contains the next instruction address.

The data flow from the instruction register 32 and the general purpose registers 30 is clearly shown in the figures thus, for conventional arithmetic operations the two multiplexers 38 and 40 may receive as input operands various fields from the instruction address register 34, instruction register 32 and the specified operands RA, RB from the general purpose registers 30. Thus the ALU 42 performs two operand operations and places the result in output buffer register 44. As will be apparent the output from the ALU may also go directly to the instruction address register 34, the condition logic and condition register block 50, the branch and trap testing logic 52 and the address gate 54 which supplies addresses to the system memory when required.

The output of the buffer register 44 is able to return data to the general purpose registers 30 via the multiplexers 46 and 48 depending upon whether the field RA or RT is specified by the instruction.

The mask and rotate logic block 56 performs a onemachine cycle executable mask and rotate operation set forth in more detail in copending U.S. patent application Ser. No. 509,836 (Y0983-011) referenced previously. The details of the condition logic and condition register block 50 are the subject matter of previously referenced copending U.S. patent application Ser. No. 509,744 (Y0983-009). The present internal bus mechanism utilizes the generated condition code bit BB. Any other bits of the condition code register to be set are specified with each internal bus instruction set forth previously.

Block 52 entitled branch and trap testing comprises the circuitry necessary to perform the trap testing function and produce a trap interrupt if necessary and also to perform "branch-on-bit" testing which latter is the subject matter of previously referenced copending U.S. patent application Ser. No. 509,734 (Y0983-010).

Gates 56 and 58 serve to gate data to and from the system memory as required for certain specified operations. These two gates and buses comprise the Data Cache Interface.

The register MQ shown in the mask and rotate logic block 56 is an extension register for storing the overflow contents from a number of arithmetic operations such as multiply and divide. It is functionally located in this block for purposes of the present embodiment as it is utilized during the certain mask and rotate instructions which are set forth and claimed in copending U.S. patent application Ser. No. 509,836 (Y0983-011).

Referring now to FIG. 3, a high level functional block diagram of the internal bus is illustrated. It will be noted in this figure that the instruction storage unit, the data storage unit, the CPU and the bus units are clearly shown. It will also be noted that the four basic blocks making up the overall system are interconnected via the internal bus which comprises the four primary components making up said bus; the A BUS, the B BUS, the C BUS and the T BUS.

It will be seen in the figure that the Data Storage unit (cache) is attached to the CPU via the internal bus interface but it should also show direct connections to the data storage unit. The same is true for the Instruction Storage unit (cache). This configuration is discretionary since the two storage units could be connected to the CPU solely via the four internal bus sub-busses or solely via the direct lines as shown. The configuration shown allows the CPU to communicate with memory via direct load or store instructions or optionally to use the full internal bus capability via the IBO instructions described previously.

The various registers shown in the Instruction Storage Unit and the Data Storage Unit are believed to be self-explanatory in that they either store addresses or data as indicated. In the CPU the instruction register, and next instruction register at the top of the CPU are for direct transfer of address and instruction data between the CPU and the Instruction Storage Block as is well known. At the bottom of the CPU the register stack and T MPX (multiplexer) receive data from the bus units via the T BUS. The A BUS is shown connected to the ALU register R1. As will be remembered this bus carries addresses between the CPU and the bus units which addresses are usually the function of an additional operation performed in the ALU by adding two quantities such as a base address and an index to form the actual address to be transmitted to the bus units. The rotate and mask unit (RMU) register R2, shown connected to the B BUS for internal bus operations, functions as a path for passing data between the CPU and bus units and is not involved, in this instance, by the rotate and mask instructions which are the subject matter of the previously referenced copending filed U.S. patent application Ser. No. 509,836 (Y0983-011).

It will be seen from FIG. 3 that the four sub busses (A, B, C and T) which make up the internal bus architecture are indicated as being connected to all bus units which may be attached to the system. However, as will be well understood, not all of the bus units would use the data on all four of the busses since the particular function of the bus unit may not require same.

Referring now to FIG. 4 a tabular definition of a PRISM CPU Internal Bus Interface organized in accordance with the present invention is set forth. The data flow direction on these busses is clearly indicated by the arrows entering and leaving the bus interface block. The numbers immediately adjacent to the arrows indicate the number of lines or bits contained in each of the particular busses. The lines without numbers indicate a single control bit.

The two columns at the left side of the figure indicate the times the lines are active and the bus or line descriptions, respectively. Thus the top three elements relate to the T BUS or data which is to be returned to the CPU while the lower four lines refer to control lines whereby the various bus units indicate their status to the CPU upon receipt of an indication that an internal bus operation is to be performed.

The two columns to the right of the figure define the output of various busses and lines emanating from the CPU interface and the times during which said lines are active.

The terminology utilized for the system clock was described previously, however, it is noted that five of the lines entering the interface are noted as being active during the time of cycles T61. This nomenclature implies that the lines would be active at the beginning of the sub-clock pulse 6 of the previous machine cycle and continue to the end of the first sub-clock pulse of the current machine cycle.

Figure 5:
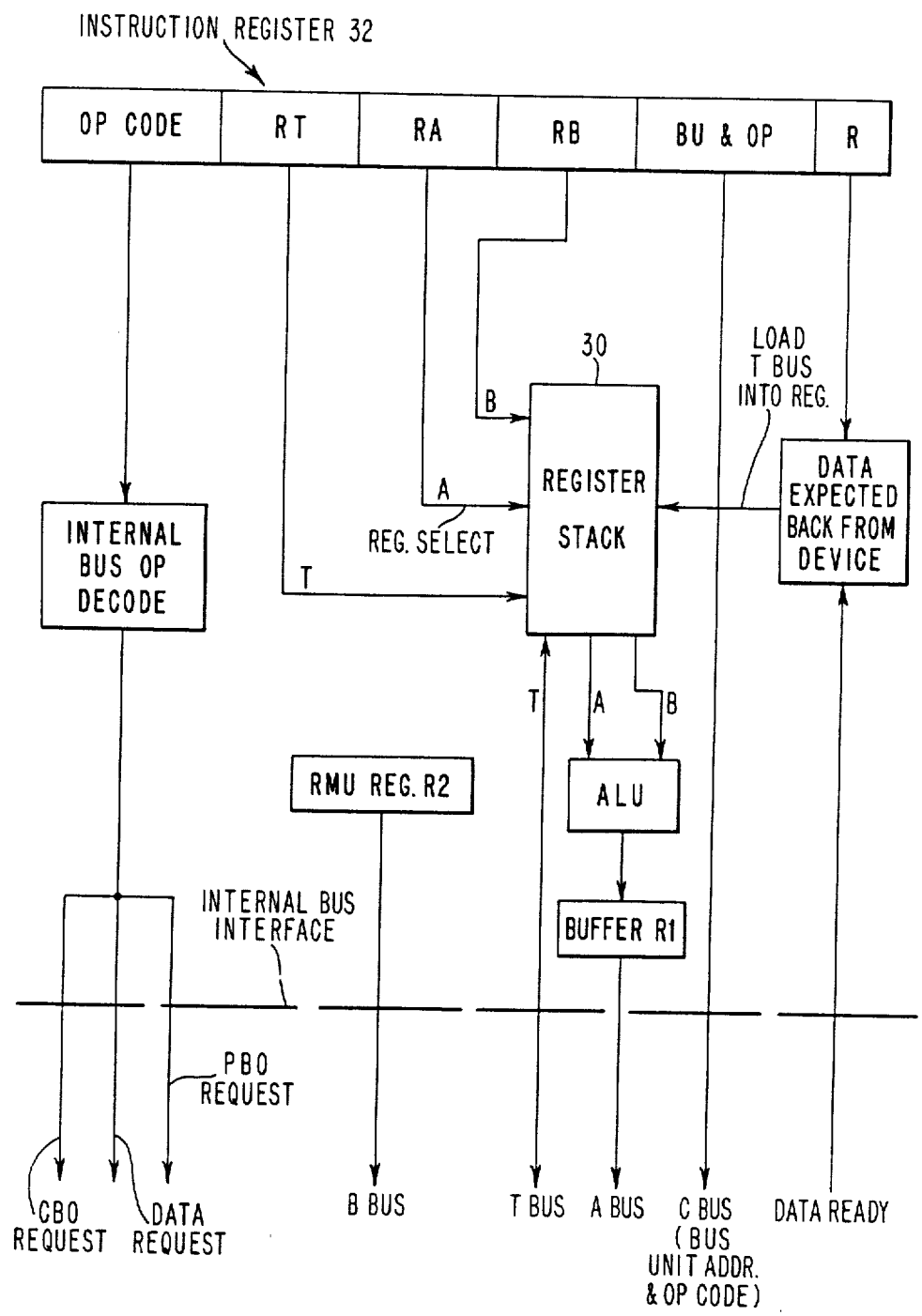
FIG. 5 is a data flow diagram of those portions of the CPU (as shown in FIG. 2) which would be active during an Internal Bus Operation.

FIG. 5 in actuality comprises a synopsis of FIGS. 2 and 4. This figure shows the more significant busses and control lines and the sources of same within the CPU. Portions of this figure are numbered or have essentially the same descriptive legends as utilized in FIG. 2 (2a and 2b). Referring to the figure it will be noted that the OP CODE field is decoded by a block marked 'internal bus op decode' this, as will be appreciated, is a function of the overall instruction decoder which will bring up one of the three lines designated CBO Request, PBO Request, or Data Request. Whenever an internal bus operation is detected, as will be apparent to those skilled in the art, one of these three lines is raised and the particular bus units to which these bus operations would apply are alerted that an internal bus operation has been encountered and one of the bus units must recognize same and respond.

The BU Field of the Instruction Register 32 is transmitted over the C-BUS and as described previously, this field provides both the device address and the particular bus unit op code which informs the device what operation is to be done.

The A-BUS receives its data from the output register R1 of the ALU. This data comprises an address which would in turn be produced by the ALU from two operands supplied thereto from the register stack. These two operands are in turn obtained from the register stack at the two addresses specified by the $R_A$ and $R_B$ fields of the instruction register.

The B-Bus which is for transferring data from the CPU to the bus units is connected to the internal bus via the rotate and mask unit register R2. As stated previously, the register R2 within the mask and rotate unit is in essence a multi purpose register which is accessable to the CPU for operations in addition to the rotate and mask operations. The register R2 is also shown in FIG. 3.

The C-Bus emanates directly from the BU field of the instruction register and as stated previously, is an eleven bit bus which contains both the bus unit address and also several bits devoted to bus unit op code. Thus, this field is used to address a particular bus unit as well as provide certain basic control information which will be apparent to those skilled in the art.

The R-field is a single bit which is utilized to tell the CPU that a particular bus operation will result in data being returned from the addressed bus unit via the T-Bus. The box marked "data expected back from device" serves to alert the CPU via the setting of a bit in a control register (not shown) that at a future time data will arrive via the T-Bus from a particular bus unit and must be stored in the register stack at location T specified by the $R_T$ field of the instruction register. When the bus unit has completed its job and the data is ready a signal would be appropriately supplied over the T-Bus valid line and a storage operation in the register stack will ensue.

Figure 6:
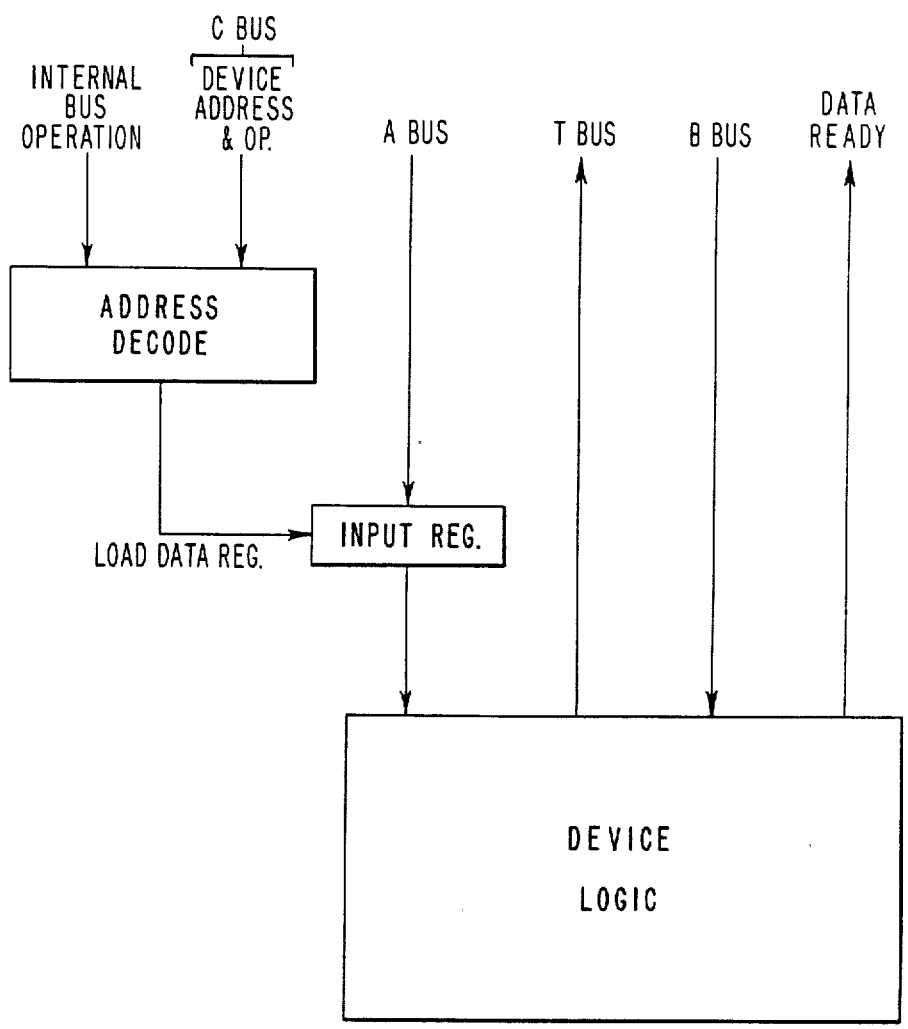
FIG. 6 is a data flow chart similar to FIG. 5 showing those portions of a typical Bus Unit which would be active in response to an Internal Bus Operation request.

Referring now to FIG. 6 a similar diagram is shown for a generic bus unit. It is understood that the bus unit control shown in the figure are intented to be general in nature in that essentially the same controls would appear in any bus unit regardless of its function. Thus referring to the figure it will be noted that the lines and busses emanating from the device are the same as those for the internal bus interface the CPU as shown in FIG. 5. The line marked "internal bus operation" indicates to the unit that a particular internal bus operation pertinent to that unit has been called for. This line is equivalent to —CBO REQ or —PBO REQ. This alerts the unit to examine the C-Bus which contains "device address and operation" information to see if the particular device address placed on the C-Bus is directed to the particular unit and if so, the operation requested is decoded and address data appearing on the A-Bus is gated into the device input register. It should be noted that depending upon the particular operation being requested of the bus unit and the nature of the bus unit, a similar input register might also be located in the B-Bus.

It should be noted that the T-Bus and line are shown emanating from the "device logic block". It should, of course, be understood that only those busses would be provided for a particular device which are needed. In the majority of cases for example, a buffer register would be provided within the device for placing data on the T-Bus at the appropriate time.

Figure 7:
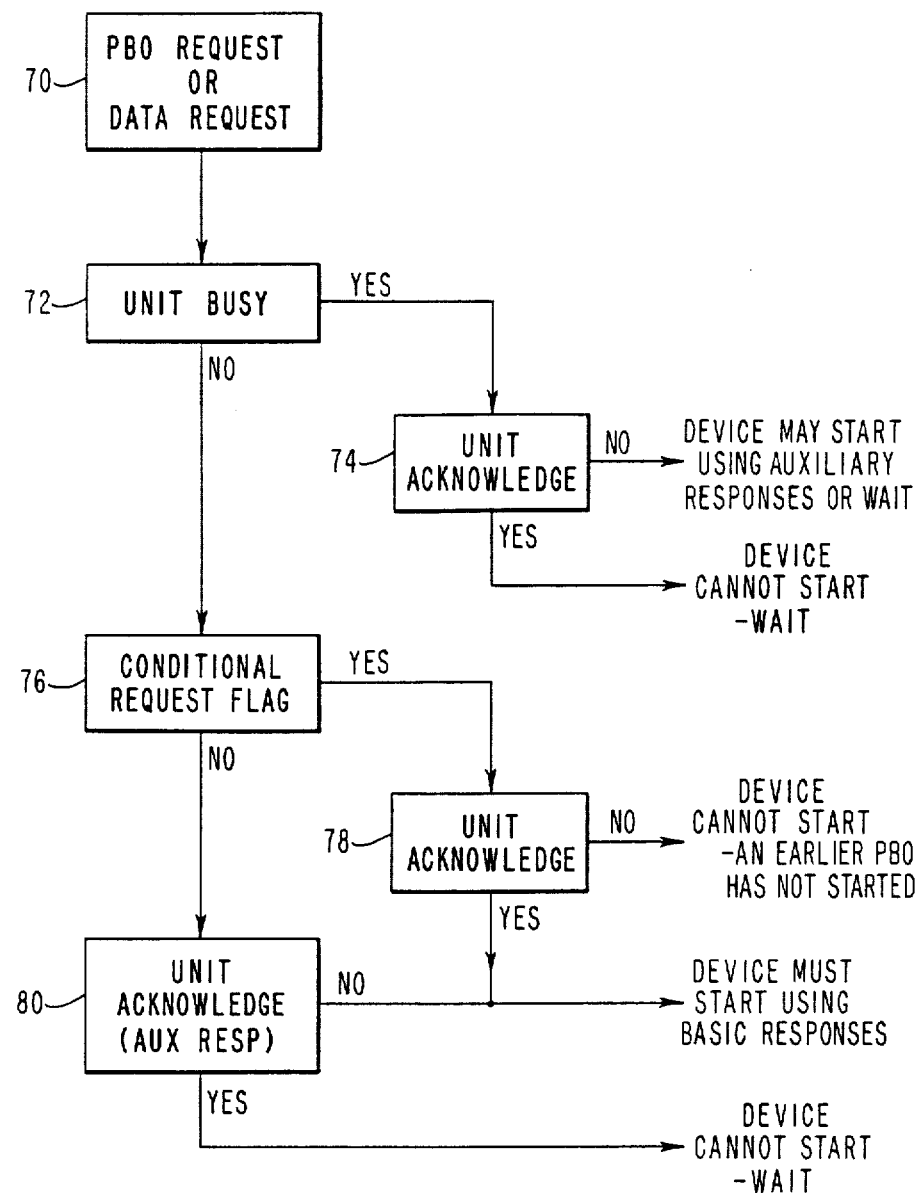
FIG. 7 comprises a flow chart of a Conditional Device Start using the PBO protocol.

FIG. 7 is a brief flow chart for the PBO and 'data request' protocols. It should be appreciated that this particular protocol could be easily varied to accommodate a particular device or system. However, this protocol represent a preferred embodiment of the invention.

It is believed that the flow chart is essentially self-explanatory. However the following description clearly explains the operations described in said flow chart with further reference to FIGS. 8, 9, 10 and 11.

Drawing Conventions for FIGS. 8, 9, 10, 11, 12 & 13

(Vertical Bar) To leading edge (i.e., start of a cycle). Therefore, distance between two vertical bars is one cycle (eight phases).

On the line labeled instruction register, the symbols between the vertical bars denote the contents of the instruction register. They are:

| | |
|---|---|
| PBO ⟶ X | PBO instruction for a non-existent device |
| PBO ⟶ 1 | PBO instruction for device number 1 |
| PBO ⟶ 2 | PBO instruction for device number 2 |
| CBO ⟶ 1 | CBO instruction for device number 1 |
| ADD | Add instruction or any valid instruction except load, store, PBO or CBO, (i.e., does not use A, B, C & T busses). |
| NSI | Next sequential instruction |
| ---⟶ | Shows the instruction being held for 1 or more cycles. |
|  | These are equivalent. |
| 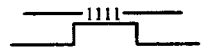 | These are equivalent, except that the data on the bus is for device number 1. (Same for device number 2, except that a 2 is used to show that the bus is valid.) Each T (as described above) also represents one phase of an eight phase cycle. The example at the top of the page is active for four phases (½ cycle). |

The CPU activates data request or PBO request for a device that uses the PBO protocol, then loads the next sequential instruction without waiting for the device response when no device has unit busy active. Since the next sequential instruction may also cause the CPU to activate data request or PBO request before the device responds to the first request, a set of rules has been generated to allow the device to conditionally respond to the second request. These rules are shown in the form of the flow chart in FIG. 7.

Blocks 70 and 76 are control lines from the CPU to the devices. Conditional request flag (block 76) is a signal from the CPU that on the preceding cycle PBO request or data request was active and no device had unit busy active, therefore, the CPU expects a response during this cycle (either unit busy or unit acknowledge).

Blocks 72, 74, 78 and 80 are control lines from the devices to the CPU. Blocks 74, 78 and 80 refer to the same control lines and block 80 is a special case of using unit acknowledge for the auxiliary response.

In summary, block 70 is a result of the current instruction in the CPU, block 76 is the result of the immediately preceding instruction in the CPU, and blocks 72, 74, 78 and 80 are DEC & CE responses to a preceding PBO request or data request. (A Y indicates that the signal named in the block is active; A N indicates that signal is inactive.)

In a quiescent system (i.e., there have been no PBO requests or data requests for several cycles and all devices are idle), unit busy, unit acknowledge, and conditional request flag are inactive. When the CPU activates a PBO request or data request, the path thru FIG. 7 is from block 70, thru block 72 and 76 to block 80, and out the N exit of block 80. The device must start execution of the operation of the next cycle and either activate unit busy (if the device could not complete the operation in one cycle) or activate unit acknowledge (if the device could complete the operation in one cycle). The CPU loads the next sequential instruction and activates the conditional request line while the device is executing the operation for the preceding request.

If the preceding request is a PBO request for a nonexistent device, neither unit acknowledge nor unit busy is made active, the CPU inhibits execution of the current instruction and the CPU takes a program check interrupt. If the current instruction is a load, store, or PBO instruction, the CPU does not wait for the device response before it activates data request or PBO request, therefore, the CPU activates conditional request flag to tell the devices not to honor the current request if there is no device response (i.e., neither unit busy nor unit acknowledge is active). This is shown on the flow chart of FIG. 7 by the path from block 70 thru block 72 to block 76, then to block 78 and out the Y exit. This is also shown in the FIG. 8 timing chart.

If the preceding request is a PBO request or a data request to an existing device and the device activates unit acknowledge (i.e., the device completed the operation) and the current instruction is a load, store, or PBO instruction, then the device must accept the current data or PBO request because the CPU is going to load the instruction. This is shown on the flow chart of FIG. 7 by the path from block 70, thru blocks 72 and 76 to block 78, and out the Y exit of block 78. This is also shown in the FIG. 9 timing chart.

If the preceding request is a PBO request or a data request to an existing device and the device activates unit busy (i.e., the device did not complete the operation) and the current instruction is a load, store, or PBO instruction, the CPU holds the current instruction (i.e., it does not load the next sequential instruction) because the current request might be for the device that is already busy to perform an operation. There are three possible cases that can exist for the sevices. They are:

1. The request is for a device that is already busy. For this case only needs to keep unit busy active until it completes the current operation. This is shown on the flow chart of FIG. 7 by the path from block 70, thru blocks 72 and 74 and out the N exit of 74. This is also shown in the FIG. 10 timing chart. When the device completes the current operation, it makes unit busy inactive and the system is quiescent (described above).

2. The request is for a non-busy device that has not implemented the auxiliary response. For this case the device only needs to wait until the system is quiescent. This is shown on the flow chart of FIG. 7 by the same path as case 1. This is also shown in the FIG. 10 timing chart.

3. The request is for a non-busy device that has implemented the auxiliary response. For this case the device begins the operation. This is shown on the flow chart of FIG. 7 by the path from block 70, thru blocks 72 to 74, and out the N exit of 74. Since the CPU holds the current instruction, the request will be sent to the device in the next cycle, however, the device must not accept this request, and, in the next cycle, the device activates unit acknowledge if it completed the operation or unit acknowledge and unit busy if it did not complete the operation. Two sub-cases can exist at this time:

(a) both devices completed their operations during the next cycle, therefore, only unit acknowledge is active and unit busy is inactive and the device does not execute the operation a second time. This is shown in the flow chart of FIG. 7 by the path from block 70, thru blocks 72 and 76 to block 80, and out the Y exit of block 80.

(b) either device does not complete its operation during the next cycle, therefore unit acknowledge and unit busy are active and the device does not execute the operation a second time. This is shown in the flow chart of FIG. 7 by the path from block 70, thru blocks 72 to 74, and out the Y exit of block 74. This is also shown in the FIG. 11 timing chart.

The preceding description coVers all possible cases, and any state of the CPU and devices has been demonstrated.

The following is a tabular synopsis of the operations illustrated in FIGS. 8, 9, 10 and 11.

Figure 8:
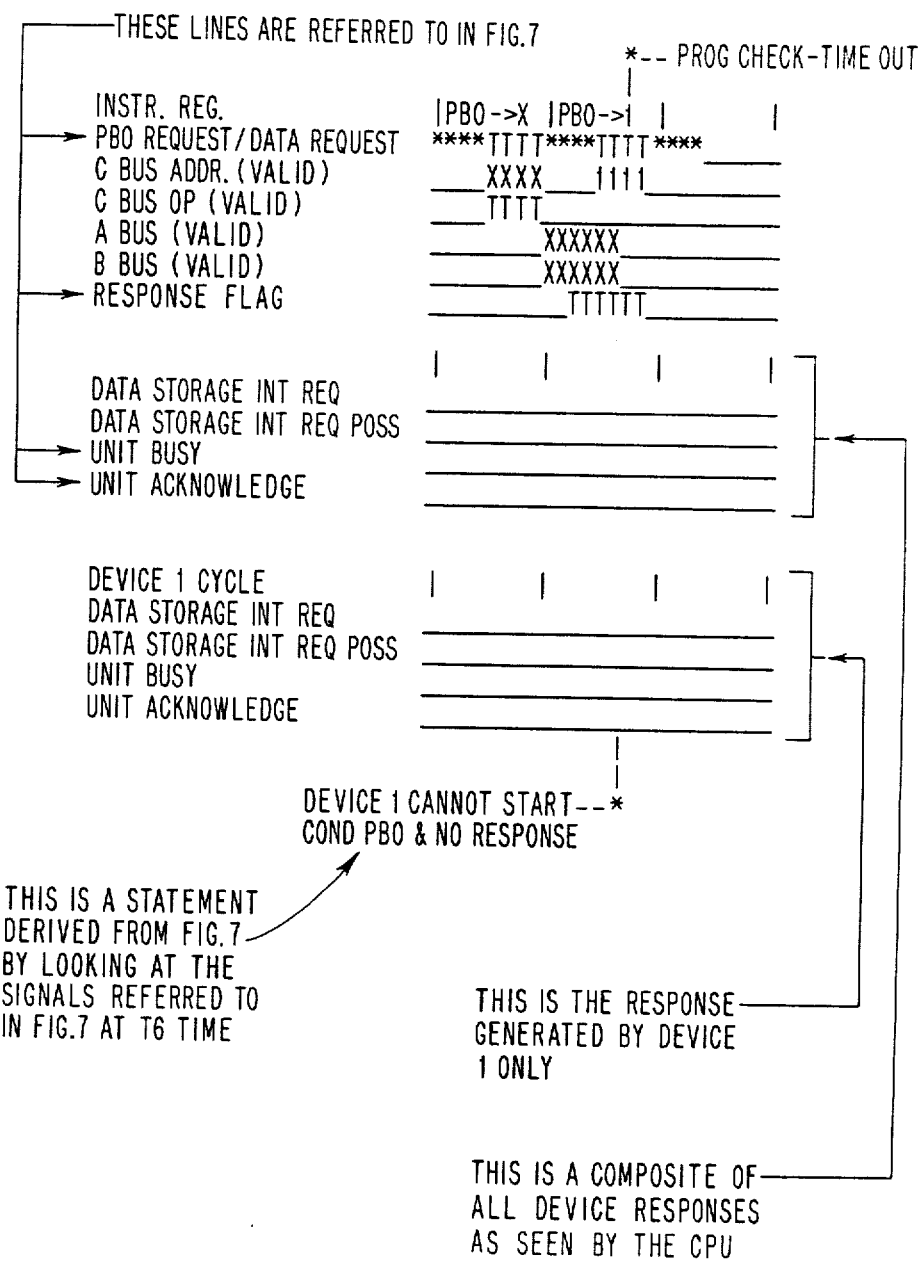
FIG. 8 comprises a timing diagram illustrating the timing and/or occurrence of certain Internal Bus Interface control signals occurring during a first possible PBO scenario on the herein disclosed Internal Bus mechanism.

FIG. 8 PBO to non-existent device then PBO to existing device.

Figures 9, 9A:
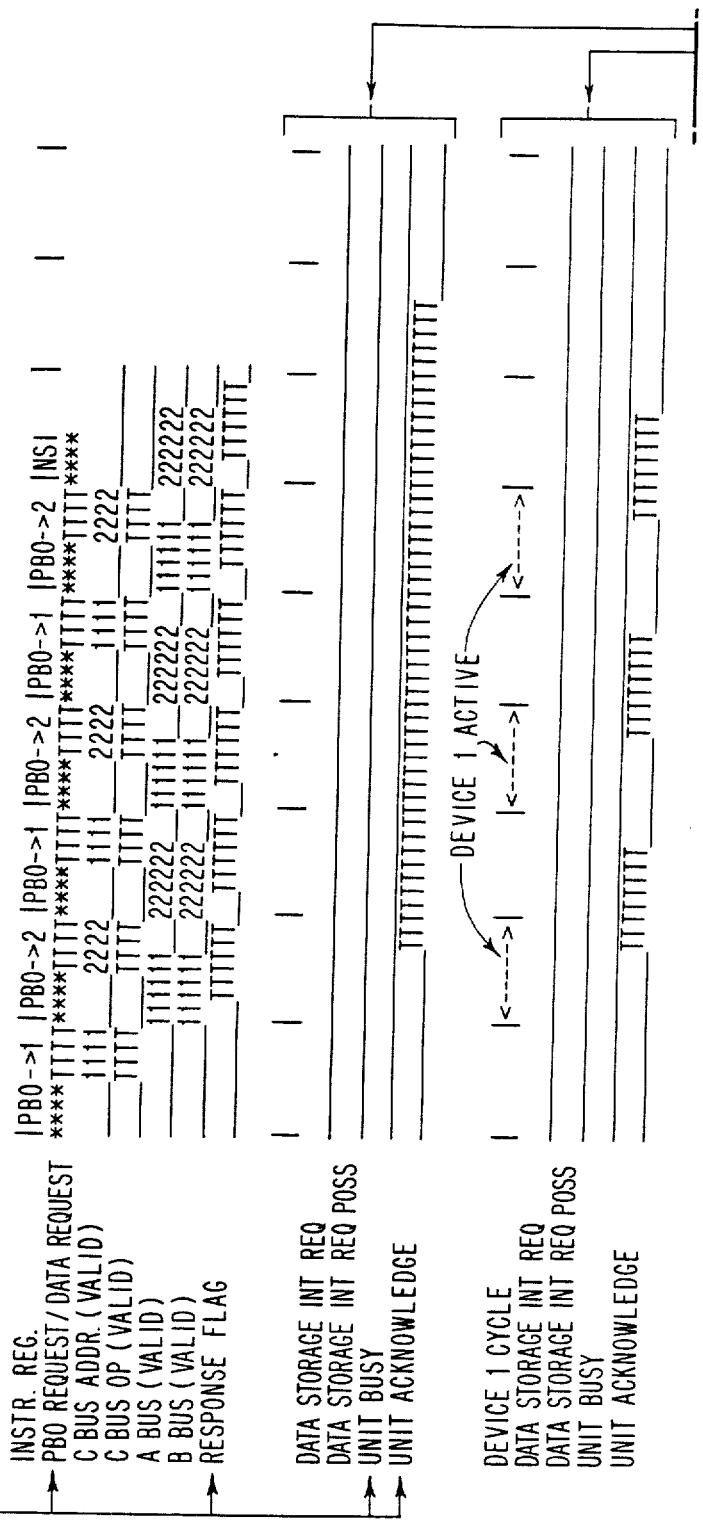
FIG. 9 is an organizational drawing of FIGS. 9A and 9B.
FIGS. 9A and 9B comprise a composite timing diagram illustrating the timing and/or occurrence of certain Internal Bus Interface control signals occurring during a second possible PBO scenario on the herein disclosed Internal Bus mechanism.
Figure 9B:
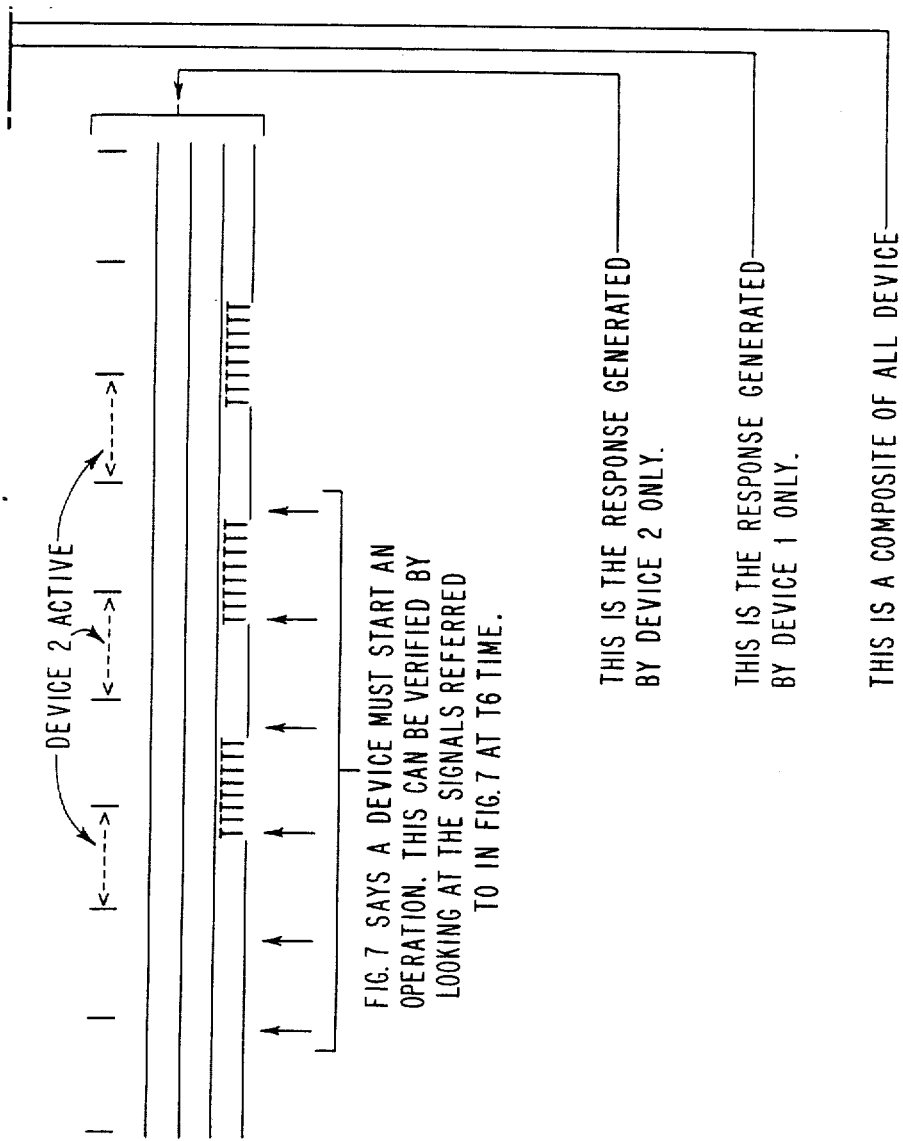

FIG. 9 pipe-lining PBO's to two devices both devices take only one cycle to complete operations both devices use basic responses (unit acknowledge) NSI=next sequential instruction.

Figure 10B:
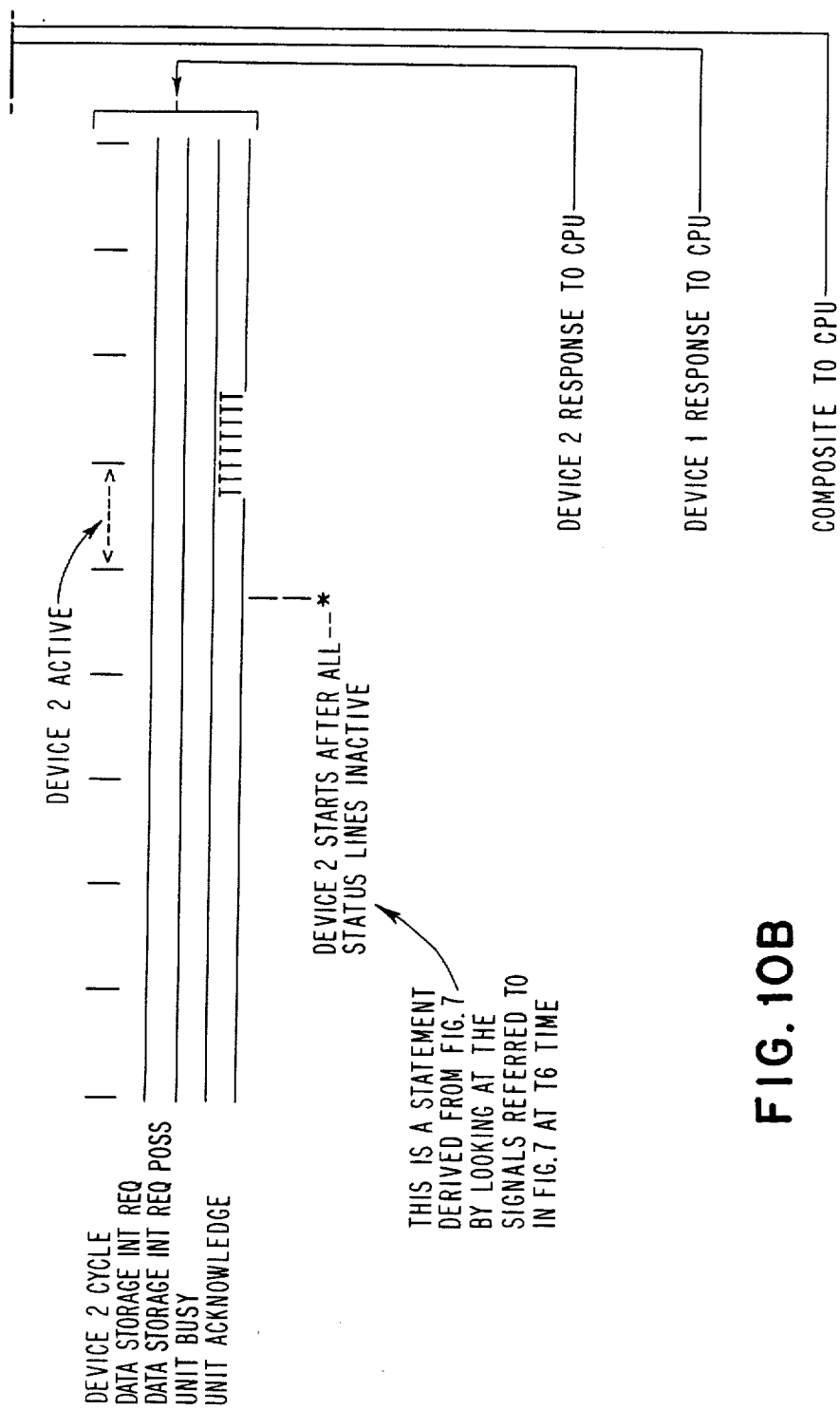

FIG. 10 PBO to Device 1; basic response (unit busy); Device 1 takes 4 cycles to complete first operation. PBO to Device 2 while Device 1 is busy; Device 2 waits until busy goes inactive (because it did not implement auxiliary protocol). Device 2 uses basic response (unit acknowledge); Device 2 takes 1 cycle to complete. CPU loads PBO to Device 1 while Device 2 is executing the operation. Device 1 uses basic response unit acknowledge); Device 1 takes 1 cycle to complete second operation. NSI =next sequential instruction.

Figure 11B:
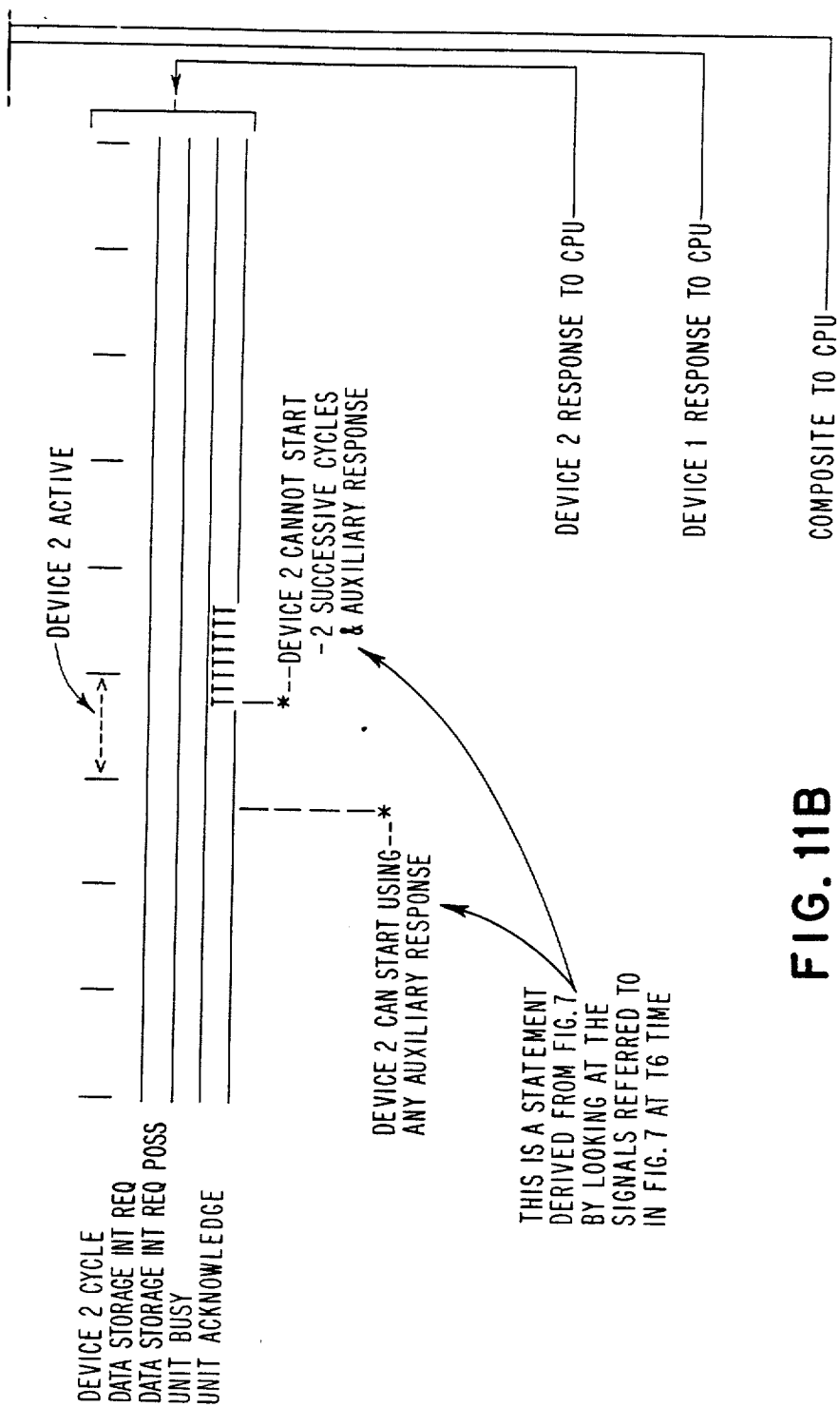

FIG. 11 PBO to Device 1; basic response (unit busy); Device 1 takes 4 cycles to complete, PBO to Device 2 while Device 1 is still busy. Device 2 uses auxiliary response (unit acknowledge); Device 2 takes 1 cycle to complete. NST=next sequential instruction.

Figure 12:
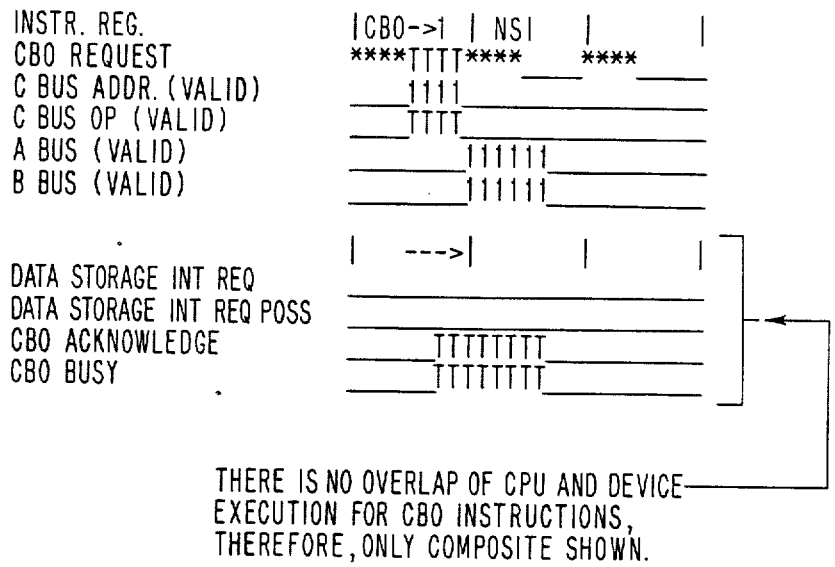
FIG. 12 comprises a timing diagram illustrating the timing and/or occurrence of certain Internal Bus Interface control signals occurring during a first possible CBO scenario on the herein disclosed Internal Bus mechanism.
Figure 13:
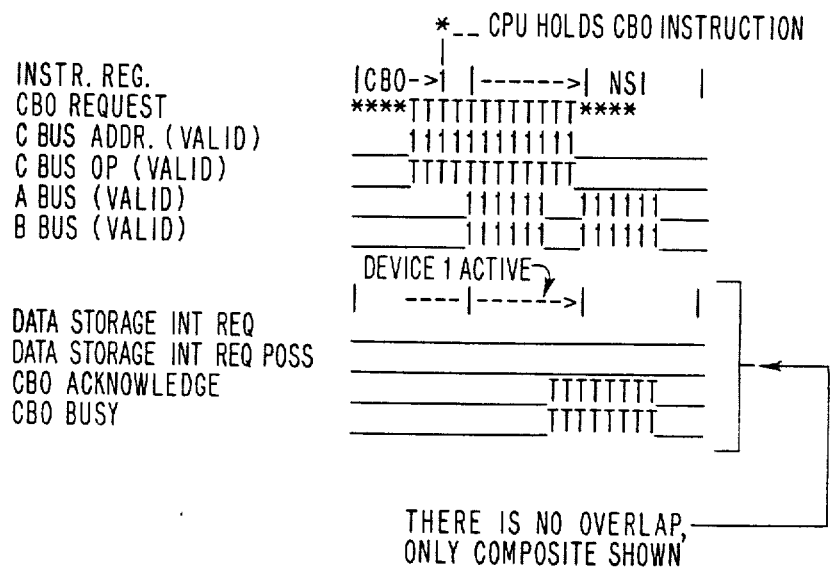
FIG. 13 comprises a timing diagram illustrating the timing and/or occurrence of certain Internal Bus Interface control signals occurring during a second possible CBO scenario on the herein disclosed Internal Bus mechanism.

FIGS. 12 and 13 are timing diagrams illustrating the operation of the present internal bus system for a CBO operation. The figures are similar to FIGS. 8–11, however, because the CBO operation is a much simpler operation than a PBO operation in the sense that the last four illustrated operations occur simultaneously in both the CPU and the device, they are shown as a composite in these two figures. Also, since the CBO operation involves only a single device, all possible ops are shown in FIGS. 12 and 13.

FIG. 12 illustrates the case where the CPU sends a CBO request and the device accepts the request and begins performing the requested task in the same cycle.

FIG. 13 illustrates the situation where the device does not pickup the CBO request until the next machine cycle.

It should be noted that in the case of FIG. 12 the CPU can begin the next sequential instruction (NSI) on the next machine cycle whereas in the case of FIG. 13 it must hold the CBO request during the next machine cycle before processing the NSI.

The above material completes the description of the preferred embodiment of the present invention. As will be apparent to those skilled in the art many changes may be made in the particular internal bus architecture without departing from the underlying spirit and scope of the invention.

Utilizing the concepts of the invention a wide variety of bus units may be attached to the CPU via the internal bus interface and extremely fast turn-around times for their functions can be obtained rather than communicating with such devices using more conventional and time consuming I/O bus protocols.

Utilizing the concepts of the present invention a wide variety of powerful functional units may be added to a relatively simple CPU as exemplified by the herein disclosed and described PRISM system architecture.

While the invention has been particularly set forth and described with respect to the herein disclosed preferred embodiment thereof, it will be readily appreciated by those skilled in the art, that changes may be made in the form and organization of the instructions and in certain hardware details which might alter certain internal operating sequences without departing from the spirit and scope of the present invention as set forth in the appended claims.

Having thus described our invention, what we claim as new, and desire to secure by Letters Patent is:

1. An internal bus architecture for a high speed digital electronic computing system including a central processing unit (CPU), a plurality of independently operable bus units each performing a fixed predetermined function under control of the CPU, and an internal bus connecting the CPU to all of said bus units, an instruction decoding mechanism in each bus unit for decoding bus instructions placed on said internal bus by the CPU, said decoding mechanism including means for determining if a bus unit operation is being requested by the CPU and, if so, an identification of the bus unit, a specific operation being requested, and all address data necessary to identify specific address operands necessary to perform said specified operation, said CPU including means for determining if an internal bus operation is being requested and, if so, means responsive thereto for determining if the CPU requires a result of the bus operation before it can proceed and, if so, causing the CPU to wait until the bus operation is completed, or if not to continue executing further instructions in parallel with the requested bus operation.

2. An internal bus architecture as set forth in claim 1 wherein the internal bus comprises a first unidirectional set of lines (B-bus) for transmitting data from the CPU to a bus unit; a second set of unidirectional lines (T-bus) for transmitting data from a bus unit to the CPU; a third set of unidirectional lines (A-bus) for transmitting address data from the CPU to a bus unit and a fourth set of unidirectional lines (C-bus) for transmitting instruction and control data between the CPU and the bus units including those fields of an internal bus operation instruction which specify an address of a bus unit, an operation to be performed by a bus unit and an operational sequence to be followed by both the CPU and the bus unit in performing the specified operation.

3. An internal bus architecture as set forth in claim 2 including means for selectively executing at least two or protocols for controlling communication between the bus units and the CPU, said two protocols including a CBO Protocol wherein the CPU waits for bus unit response (CBO ACKNOWLEDGE) before continuing instruction execution and a PBO Protocol for Pipelined Bus Operations (PBO), Load, or Store instructions and further means in the CPU for monitoring bus unit status and means responsive thereto for conditionally continuing instruction execution and control means in both the CPU and each bus unit to effect one of said at least two protocols when a CBO or PBO internal bus instruction in the instruction stream of the CPU is being executed.

4. An internal bus architecture as set forth in claim 3 including communication means in each bus unit for notifying the CPU using the CBO protocol and causing the bus unit to either wait for a requested operation to be completed by the bus unit before returning an 'acknowledge' signal to the CPU or to set a 'device busy' bit in a condition register located in the CPU.

5. An internal bus architecture as set forth in claim 4 including means in each bus unit and the CPU for determining that the PBO protocol is being used and for causing a plurality of different bus units to perform requested tasks concurrently, and means for causing the CPU to stop executing additional instructions when it is determined that a second PBO request has been sent to a bus unit that is still performing a previously requested PBO task.

6. In a digital electronic computing system including a memory hierarchy, a CPU and a memory bus network interconnecting same, said CPU including an arithmetic and logic unit (ALU) for performing mathematical and logical operations on operands supplied thereto, an instruction unit for processing instructions to be performed by said CPU and condition code generating means for generating a plurality of specified data bits in accordance with the output of the ALU and other system components attached to the CPU, the improvement which comprises: an internal bus coextensive with said memory bus and a plurality of bus units attached to said internal bus each of which is addressable by and includes means capable of performing certain internal bus operations on command from the CPU in response to an internal bus instruction being executed by the CPU, said internal bus comprising: a first unidirectional set of lines (B-bus) for transmitting data to a bus unit, a second set of unidirectional lines (T-bus) for transmitting data from a bus unit to the CPU; a third set of unidirectional lines (A-bus) for transmitting address data, specifying operands to be used, from the CPU to a bus unit and a fourth set of unidirectional lines (C-bus) for transmitting instruction and control data between the CPU and the bus units, bus driver circuit means located in the CPU and each bus unit for placing data on the respective lines making up the bus, means in each bus unit for recognizing address data on said C-bus for detecting when said bus unit is addressed by an internal bus command.

7. In a digital electronic computing system as set forth in claim 6, said improvement further including means in the CPU for receiving and decoding an 'internal bus op' instruction which includes fields specifying:

(a) that an internal bus operation is being requested by the instruction,
(b) a designation of a particular internal bus operation,
(c) a register designation in the CPU which is to receive the result of the operation,
(d) an identification of the operands to be used in the operation,
(e) an indication of the operation to be performed by a bus unit,
(f) an address of a specific bus unit whose operation is being requested, and
(g) an indication that a result is to be expected from the bus unit.

8. In a digital electronic computing system as set forth in claim 7, said improvement further including means in each bus unit for continuously monitoring all requests from the CPU placed on the internal bus, and for recognizing that an operation in the bus unit is being requested, and means responsive to such a request for accepting all operand and operation data included in the instruction, and means for determining that said bus unit is not already busy.

9. In a digital electronic computing system as set forth in claim 8, said improvement further including means in the CPU for selectively executing at least two or protocols for controlling communication between the bus units and the CPU, said two protocols including a CBO Protocol wherein the CPU waits for bus unit response (CBO ACKNOWLEDGE) before continuing instruction execution and a PBO Protocol for Pipelined Bus Operations (PBO), Load, or Store instructions, including means in the CPU for monitoring bus unit status and means responsive thereto for conditionally continuing instruction execution, and control means in both the CPU and each bus unit to effect one of said at least two protocols when it is determined that a CBO or PBO internal bus instruction is encountered in the instruction stream of the CPU.

10. In a digital electronic computing system as set forth in claim 9, said improvement further including means in the CPU instruction decoder for specifying that a particular internal bus operation will cause data to be returned to the CPU and means responsive to such specification for making a register available in the CPU to receive said returned data.

11. In a digital electronic computing system as set forth in claim 10, said improvement further including means in the CPU selectively actuable in response to means for determining that an internal bus operation specifying that the CBO protocol is being executed, and that a response thereto is not received within a predetermined period of time for causing an interrupt to occur.

12. In a digital electronic computing system as set forth in claim 10, said improvement further including means in the CPU selectively actuable in response to means for determining that an internal bus operation specifying that the PBO protocol is being executed, for repeating an internal bus instruction following the PBO protocol to a particular bus unit, means for determining if the bus unit has responded and means responsive to an affirmative determination to cause the CPU to proceed with the execution of the next sequential instruction.

* * * * *